(12) United States Patent
Tsutsumi

(10) Patent No.: US 8,937,668 B2
(45) Date of Patent: Jan. 20, 2015

(54) IMAGE PROCESSING DEVICE, IMAGE PROCESSING METHOD, AND PROGRAM

(75) Inventor: Shohei Tsutsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 13/415,068

(22) Filed: Mar. 8, 2012

(65) Prior Publication Data

US 2012/0236168 A1    Sep. 20, 2012

(30) Foreign Application Priority Data

Mar. 15, 2011   (JP) ................ 2011-056525

(51) Int. Cl.
| | |
|---|---|
| H04N 5/225 | (2006.01) |
| H04N 5/228 | (2006.01) |
| G06T 5/50 | (2006.01) |
| H04N 5/232 | (2006.01) |
| H04N 5/235 | (2006.01) |

(52) U.S. Cl.
CPC ............. *H04N 5/2258* (2013.01); *G06T 5/50* (2013.01); *H04N 5/23238* (2013.01); *H04N 5/23267* (2013.01); *H04N 5/2353* (2013.01); *G06T 2200/21* (2013.01)
USPC .................. 348/218.1; 348/208.99

(58) Field of Classification Search
CPC ...................................... H04N 5/232
USPC .................................... 348/218.1
See application file for complete search history.

(56) References Cited

U.S. PATENT DOCUMENTS

| | | | |
|---|---|---|---|
| 2005/0280702 A1* | 12/2005 | Nakano et al. | 348/42 |
| 2007/0085919 A1* | 4/2007 | Sato | 348/302 |
| 2008/0239135 A1* | 10/2008 | Tamura | 348/335 |
| 2009/0079836 A1* | 3/2009 | Mishima et al. | 348/208.4 |
| 2009/0115860 A1* | 5/2009 | Nakashima et al. | 348/208.99 |
| 2010/0149368 A1* | 6/2010 | Yamashita et al. | 348/222.1 |
| 2012/0162382 A1* | 6/2012 | Hirasawa et al. | 348/47 |

FOREIGN PATENT DOCUMENTS

| | | | | |
|---|---|---|---|---|
| JP | 2006-074693 A | | 3/2006 | |
| JP | 2007142507 | * | 6/2007 | ............ H04N 5/232 |
| JP | 2009-239822 A | | 10/2009 | |

* cited by examiner

*Primary Examiner* — Nhan T Tran
*Assistant Examiner* — Chan Nguyen
(74) *Attorney, Agent, or Firm* — Fitzpatrick, Cella, Harper & Scinto

(57) ABSTRACT

To provide an image including no blur from a plurality of images acquired by a camera array image capturing device. An image processing device of the present invention is characterized by including an image acquisition unit configured to acquire a plurality of images captured by a camera array image capturing device having a plurality of image capturing units the exposure conditions of which are different from one another, an overlap region calculation unit configured to calculate an overlap region in which field angles overlap in the plurality of image capturing units from the acquired plurality of images, and a blurred image detection unit configured to detect an image including a blur using a region image of the plurality of images corresponding to the overlap region calculated by the overlap region calculation unit.

14 Claims, 23 Drawing Sheets

WHEN m=0, n IS 1 TO 8

WHEN m=1, n IS 2 TO 8

WHEN m=2, n IS 3 TO 8

WHEN m=3, n IS 4 TO 8

WHEN m=4, n IS 5 TO 8

WHEN m=5, n IS 6 TO 8

WHEN m=6, n IS 7 OR 8

WHEN m=7, n IS 8

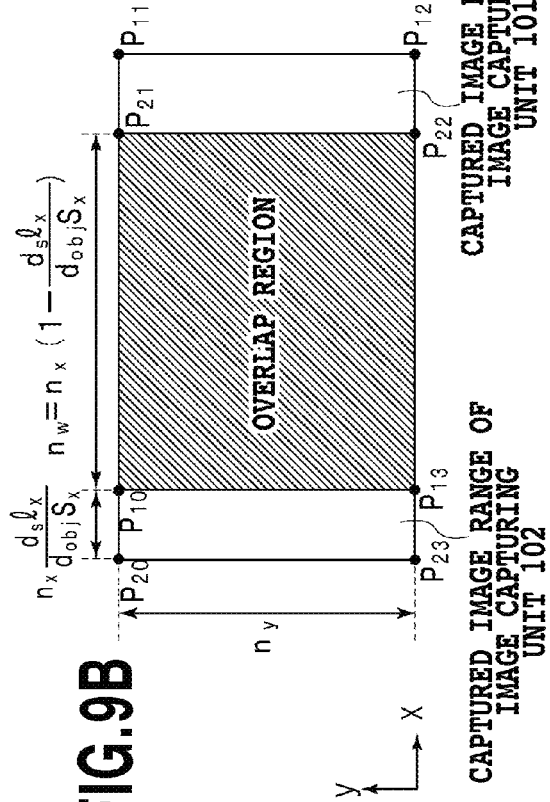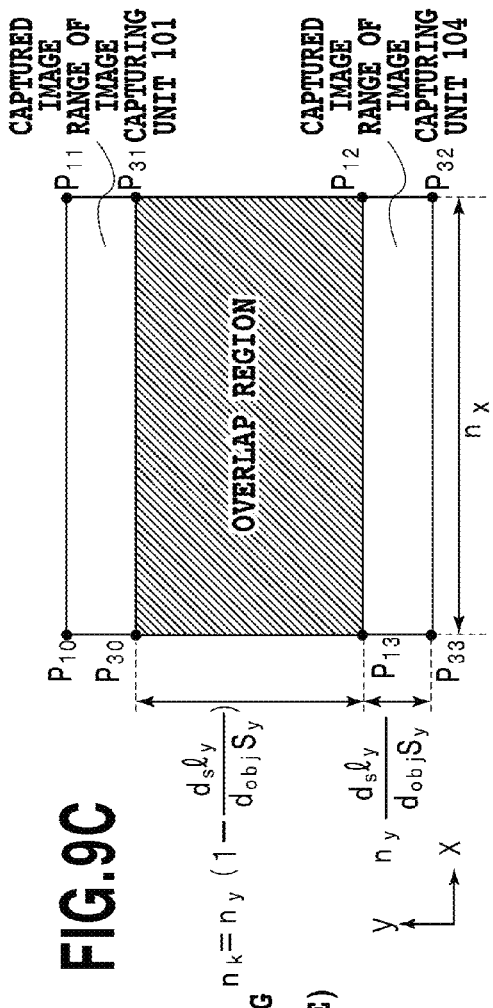
FIG.9A  FIG.9B  FIG.9C

BLURRED IMAGE

IMAGE PROCESSING DEVICE, IMAGE PROCESSING METHOD, AND PROGRAM

BACKGROUND OF THE INVENTION

1. Field of the Invention

The present invention relates to an image processing device, an image processing method, and a program for providing an image with no blur from a plurality of images acquired by a camera array image capturing device.

2. Description of the Related Art

Accompanying an increase in the number of pixels and improvement of the zoom function of a recent image capturing device, a blur of a captured image caused by a camera shake when capturing an image becomes a technical issue and an image capturing device with a camera shake correction function is used widely. As a system to realize such a camera shake correction function, there is generally known an optical camera shake correction system that optically corrects a camera shake by a gyro sensor that detects an angular speed caused by the camera shake and a drive unit that controls the relative position of a lens and an image capturing element so as to eliminate the camera shake.

As a different system, there has been proposed an electronic camera shake correction system that generates an image with no blur by taking in a plurality of images at a high shutter speed and by electronically aligning and superimposing the plurality of taken-in images (for example, Japanese Patent Laid-Open No. 2006-074693). This electronic camera shake correction system does not need any gyro sensor, and therefore, has an advantage not only in downsizing the image capturing device but also in suppressing the manufacturing cost.

As another method for acquiring a captured image in which the influence of a camera shake is suppressed, there is a method for continuously capturing images (bracket capturing) with different shutter speeds (for example, Japanese Patent Laid-Open No. 2009-239822). In this method, a camera shake is detected when the shutter is half-pressed and when the amount of shake is not more than a specified value, one image is captured as usual but when the amount of shake is not less than the specified value, bracket capturing is performed. This method has an advantage in that it is made easy to capture an image with no blur by performing bracket capturing.

However, in the electronic camera shake correction system proposed in Japanese Patent Laid-Open No. 2006-074693, it is premised that each acquired image includes no blur, and therefore, when a blur is included, there is such a problem that it is not possible to successfully perform image alignment between each image. Further, when capturing an image of a night scene etc., noise tends to be applied to the captured image, and therefore, an exposure time of a fixed period of time or more is necessary to reduce the noise. If the exposure time is lengthened, it is more likely that a blur is included accordingly and image alignment between each image becomes insufficient. As a result of that, the electronic camera shake correction system described in Patent Document 1 has such a problem that it is not possible to sufficiently correct a camera shake even by adding and combining images after the image alignment.

On the other hand, in the bracket capturing proposed in Japanese Patent Laid-Open No. 2009-239822, the image capturing time is lengthened, and therefore, there is a case where preferred shutter timing is missed when there exits a moving subject in the scene to be captured. Further, when there is a difference between the amount of shake at the time of half-pressing of the shutter and that at the time of actual image capturing, there is a possibility that even one image with no blur cannot be captured because it is not possible to perform bracket capturing with a preferred combination of shutter speeds.

SUMMARY OF THE INVENTION

An image processing device according to the present invention is characterized by comprising an image acquisition unit configured to acquire a plurality of images captured by a camera array image capturing device having a plurality of image capturing units with different exposure conditions, an overlap region calculation unit configured to calculate an overlap region where field angles overlap in the plurality of image capturing units from the acquired plurality of images, and a blurred image detection unit configured to detect an image including a blur using a region image of the plurality of images corresponding to the overlap region calculated by the overlap region calculation unit.

According to the image processing device and the image processing method according to the present invention, it is possible to provide an image with no blur more reliably.

Further features of the present invention will become apparent from the following description of exemplary embodiments (with reference to the attached drawings).

BRIEF DESCRIPTION OF THE DRAWINGS

FIGS. 9A to 9C are diagrams for explaining an overlap region;

DESCRIPTION OF THE EMBODIMENTS

First Embodiment

Figure 1:
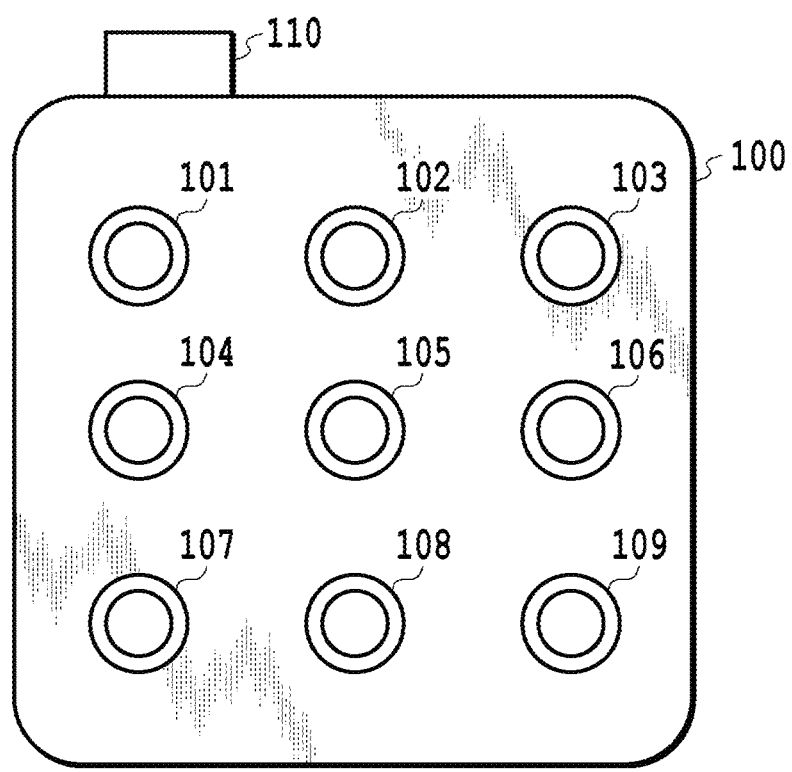
FIG. 1 is a diagram showing an example of a camera array image capturing device comprising a plurality of image capturing units.

FIG. 1 is a diagram showing an example of a camera array image capturing device (also referred to simply as a "camera array", as known as camera array system, multiple lens camera, and the like) including a plurality of image capturing units.

Reference numeral 100 denotes a case of an image capturing device, which includes nine image capturing units 101 to 109 configured to acquire a color image and an image capturing button 110. The nine image capturing units are arranged uniformly in the form of a square lattice.

When a user presses down the image capturing button 110, the image capturing units 101 to 109 receive optical information of a subject by a sensor (image capturing element) and the received signal is A/D converted and thus a plurality of color images (digital data) is acquired at the same time.

By such a camera array image capturing device, it is possible to acquire a plurality of color images of the same subject captured from a plurality of viewpoints.

Here, the number of image capturing units is nine, but, the number of image capturing units is not limited to nine. It is possible to apply the present invention as long as an image capturing device has a plurality of image capturing units.

Here, an example is explained where nine image capturing units are arranged uniformly in the form of a square lattice, but, the arrangement of the image capturing units is arbitrary. For example, they may be arranged in a radial form or linear form, or may be arranged quite randomly.

Figure 2:
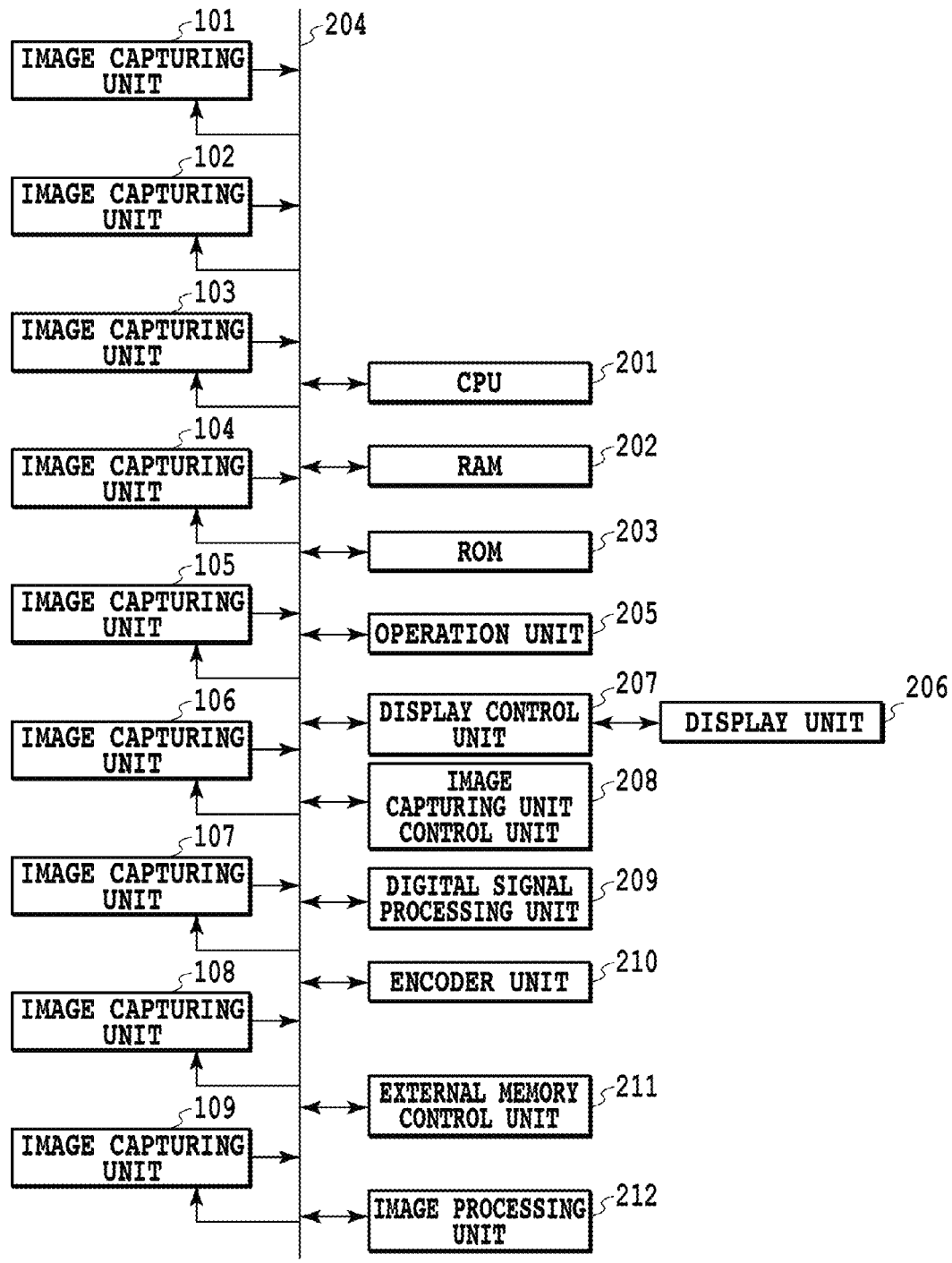
FIG. 2 is a block diagram showing an internal configuration of a camera array image capturing device.

FIG. 2 is a block diagram showing an internal configuration of the image capturing device 100.

A central processing unit (CPU) 201 totally controls each unit, to be described below.

A RAM 202 functions as a main memory, work area, etc., of the CPU 201.

A ROM 203 stores a control program etc. to be executed by the CPU 201.

A bus 204 serves as a transfer path of various pieces of data. For example, digital data acquired by the image capturing units 101 to 109 is sent to a predetermined processing unit via the bus 204.

An operation unit 205 configured to receive an instruction of a user, including buttons, mode dials, etc.

A display unit 206 configured to display captured images and characters and, for example, a liquid crystal display is used. The display unit 206 may have a touch screen function and in such a case, it is possible to handle a user's instruction using the touch screen as an input to the operation unit 205.

A display control unit 207 controls a display of captured images and characters displayed on the display unit 206.

An image capturing unit 208 control unit controls an image capturing system based on an instruction from the CPU 201, such as focusing, opening/closing a shutter, adjusting a diaphragm, etc.

A digital signal processing unit 209 performs various kinds of processing on digital data received via the bus 204, such as white balance processing, gamma processing, and noise reduction processing.

An encoder unit 210 performs processing to convert digital data into a file format, such as JPEG and MPEG.

An external memory control unit 211 also serves as an interface to connect with a PC and other media (for example, a hard disc, memory card, CF card, SD card, and USB memory).

An image processing unit 212 performs processing to select and output an image with no blur from a plurality of color images acquired by the image capturing units 101 to 109 or from a plurality of color images output from the digital signal processing unit 208. Details of the image processing unit 212 will be described later.

There exist components of the image capturing device other than those described above, but they are not the main point of the present invention, and therefore, their explanation is omitted.

Figure 3:
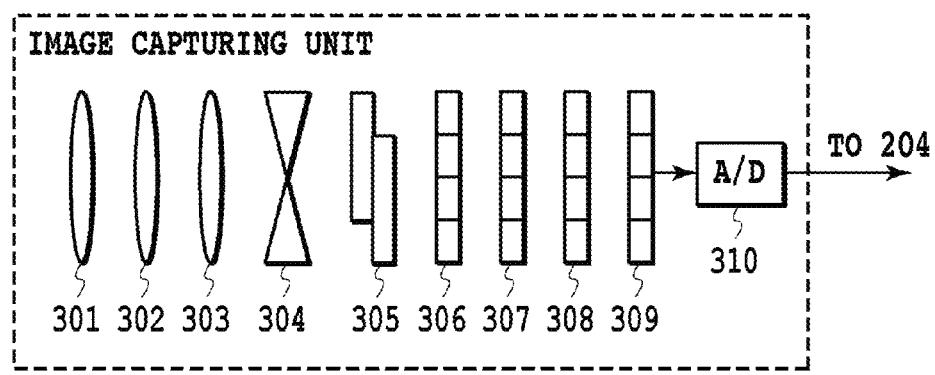
FIG. 3 is a diagram showing an internal configuration of an image capturing unit.

FIG. 3 is a diagram showing an internal configuration of the image capturing units 101 to 109.

The image capturing units 101 to 109 include lenses 301 to 303, a diaphragm 304, a shutter 305, an optical low pass filter 306, an iR-cut filter 307, a color filter 308, a sensor 309, and an A/D conversion unit 310. The lenses 301 to 303 are a zoom lens 301, a focus lens 302, and a camera shake correction lens 303, respectively. The sensor 309 is a sensor, for example, such as CMOS and CCD.

When the sensor 309 detects a quantity of light of a subject, the detected quantity of light is converted into a digital value by the A/D conversion unit 310 and output to the bus 204 as digital data.

Figure 4:
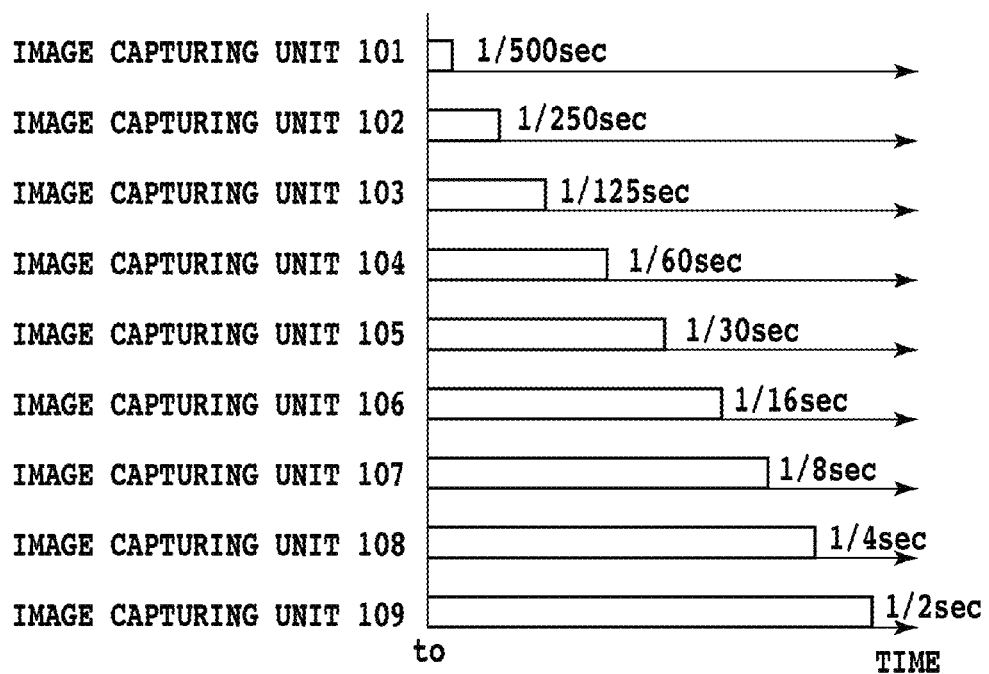
FIG. 4 is a diagram showing an example of a shutter speed of an image capturing unit.

FIG. 4 illustrates an example of the shutter speed of the image capturing units 101 to 109.

The image capturing unit control unit 208 controls each shutter of the image capturing units 101 to 109 so that the respective shutter speeds of the image capturing units 101 to 109 differ stepwise as shown in FIG. 4. In the example of FIG. 4, the respective shutter speeds of the image capturing units 101 to 109 are set so as to differ stepwise from $1/500$ sec, which is the fastest (shortest) shutter speed, to $1/2$ sec, which is the slowest (longest) shutter speed. The example shown in FIG. 4 is just an example, and as a matter of course, it may also be possible to set a wider separation between the fastest shutter speed and the lowest shutter speed by setting the fastest shutter speed to, for example, $1/1,000$ sec. Further, in the example in FIG. 4, the shutter speeds are set to be linearly different, but they may be different nonlinearly. Furthermore, it may also be possible to set the shutter speeds different randomly without giving any regularity to the change of the shutter speed. For example, it may also be possible to set the shutter speed of the image capturing unit 101 to $1/30$ sec, that of the image capturing unit 102 to $1/4$ sec, that of the image capturing unit 103 to $1/500$ sec, and so on.

In the present embodiment, it is assumed that the shutter speeds of the image capturing units 101 to 109 are set in advance, but it may also be possible to enable a user to set the shutter speed arbitrarily through the operation unit 205 or the display unit 206. The timing at which the shutter starts of the image capturing units 101 to 109 is the same and set so that the shutter starts at time to.

In the present embodiment, a case is explained where the shutter speed of each image capturing unit is set to be different from one another, but the shutter speed is only one of items to make the exposure condition differ in each image capturing unit. That is, as a technique to make the exposure condition differ in each image capturing unit, it may also be possible to make the f-stop (F-number) or ISO speed differ in each image capturing unit.

<Configuration Diagram of Image Processing Unit>

Figure 5:
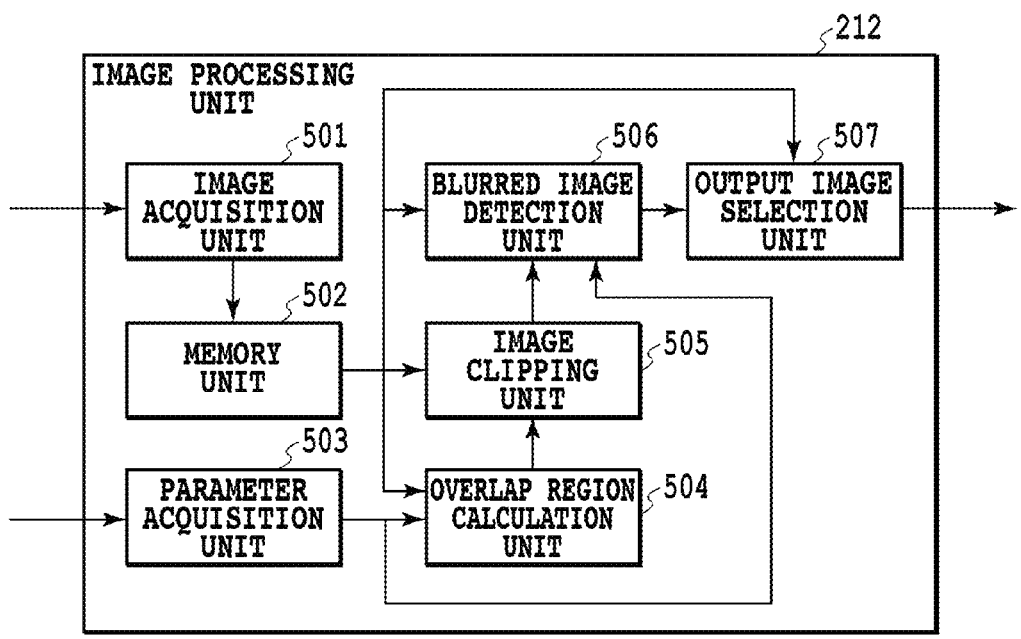
FIG. 5 is a block diagram showing an internal configuration of an image processing unit according to a first embodiment.

FIG. 5 is a block diagram showing an internal configuration of the image processing unit 212.

Reference numeral 501 denotes an image acquisition unit, which acquires a plurality of color images supplied from the image capturing units 101 to 109 via the bus 204.

Reference numeral 502 denotes a memory unit, which temporarily stores a plurality of color images supplied from the image acquisition unit 501.

Reference numeral 503 denotes a parameter acquisition unit, which acquires various parameters of the image capturing units 101 to 109 at the time of image capturing. Parameters include, for example, the focal length of the image capturing unit, the sensor size, the number of pixels of the sensor, the focus position (distance between camera and subject), the relative position of the image capturing unit, the shutter speed, etc.

Reference numeral 504 denotes an overlap region calculation unit, which calculates a region in which the field angle of each image capturing unit overlaps (hereinafter, referred to as an "overlap region") using parameters supplied from the parameter acquisition unit 503.

Reference numeral 505 denotes an image clipping unit, which performs processing to clip an image (region image) corresponding to the overlap region given by the overlap region calculation unit 504 from the group of color images stored in the memory unit 502. As will be described later, the image clipping unit 505 may be omitted.

Reference numeral 506 denotes a blurred image detection unit, which detects an image including a blur from the clipped images. When adopting a configuration in which the image clipping unit 505 is omitted, the blurred image detection unit 506 also performs processing to calculate the above-mentioned region image.

Reference numeral 507 denotes an output image selection unit, which selects an image other than the image detected as an image including a blur by the blurred image detection unit 506, that is, a color image including no blur as an output image from the group of color images stored in the memory unit 502.

Next, details of image processing performed by each unit described above of the image processing unit 212 are explained.

Figure 6:
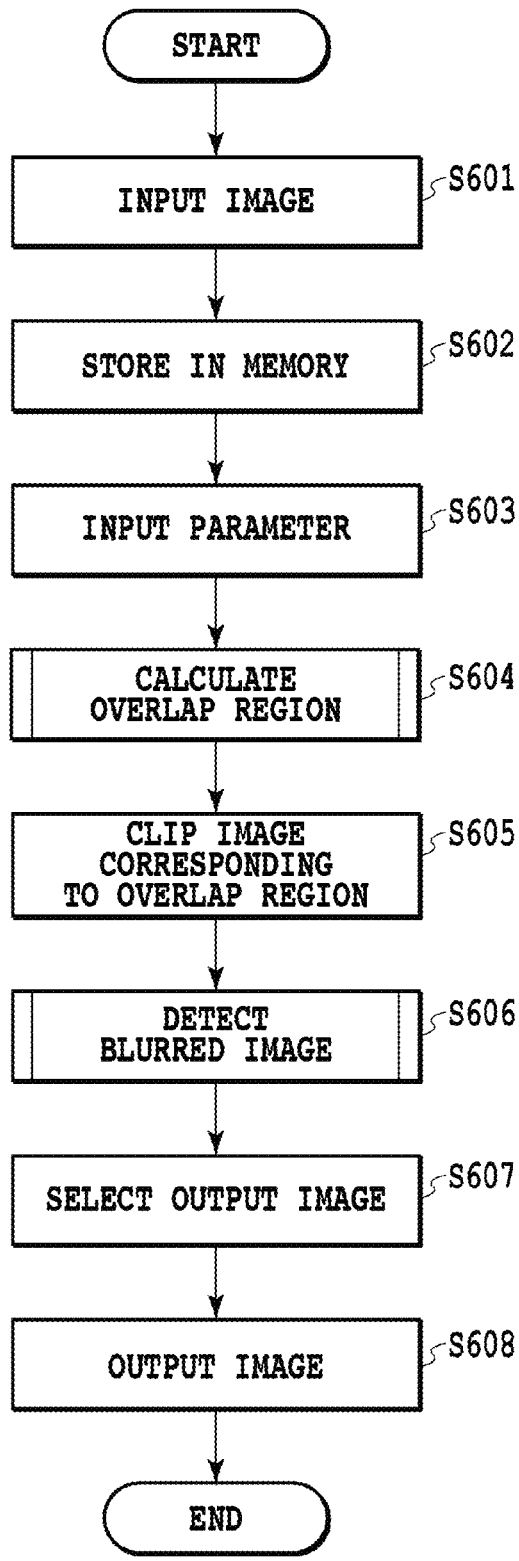
FIG. 6 is a flowchart showing a flow of processing in the image processing unit according to the first embodiment.

FIG. 6 is a flowchart showing a flow of processing in the image processing unit 212.

In step 601, the image acquisition unit 501 receives color images from the image capturing units 101 to 109. In the present embodiment, there are nine image capturing units, and therefore, digital data of nine color images is input as a result.

In step 602, the memory unit 502 stores digital data of the input color images and temporarily retains the data.

In step 603, the parameter acquisition unit 503 acquires parameters relating to the image capturing units 101 to 109.

In step 604, the overlap region calculation unit 504 calculates an overlap region using the acquired parameters. Details of a method for calculating an overlap region will be described later.

In step 605, the image clipping unit 505 performs processing to clip a region image corresponding to the overlap region on the group of color images stored in the memory unit 502 based on the overlap region given by the overlap region calculation unit 504.

In step 606, the blurred image detection unit 506 detects an image including a blur using the region image clipped by the image clipping unit 505. Specifically, the blurred image detection unit 506 finds an image including a blur by referring to the shutter speed of each image capturing unit, quantitatively evaluating the blur included in the region image clipped by the image clipping unit 505, and discriminating between region images with a blur and those with no blur. Details of blurred image detection processing will also be described later.

In step 607, the output image selection unit 507 selects the image of the region image with no blur as an output image. In this case, when there exists a plurality of images determined to include no blur, the output image selection unit 507 selects the image the shutter speed of which is the slowest (longest) as an output image from among these images. This is because the image captured with the slower shutter speed is more unlikely to be affected by noise of the sensor, and therefore, noise is suppressed in the image.

In step 608, when the image selected by the output image selection unit 507 is output, the processing is completed.

The above is the outline of processing in the image processing unit 212 and by performing such processing, it is made possible to provide an image with no blur.

In the flowchart shown in FIG. 6, it is premised that the image clipping unit 505 is provided. However, as described above, the image clipping unit 505 may be omitted. For example, it may also be possible to cause the blurred image detection unit 506 to acquire the overlap region calculated by the overlap region calculation unit 504 and the plurality of captured images stored in the memory unit 502 and to detect a blurred image for the calculated region image by calculating the region image corresponding to the overlap region in the captured images.

Following the above, details of overlap region calculation processing and blurred image detection processing are explained sequentially.

<Overlap Region Calculation Processing>

Details of overlap region calculation processing performed in step S604 of the flowchart in FIG. 6 are explained.

Figure 7:
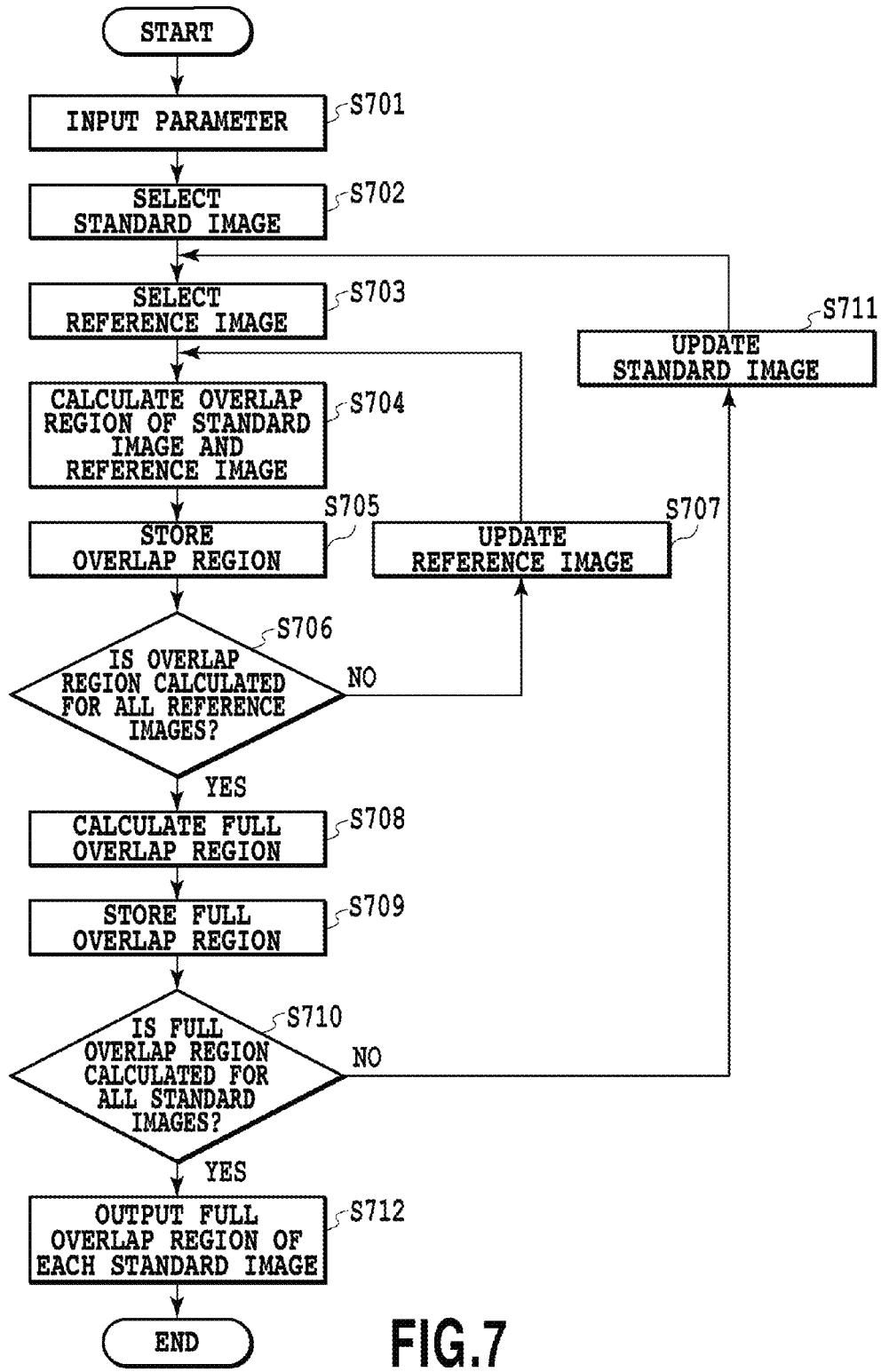
FIG. 7 is a flowchart showing a flow of overlap region calculation processing.

FIG. 7 is a flowchart showing a flow of overlap region calculation processing.

In step S701, the overlap region calculation unit 504 receives the parameters previously described relating to the image capturing units 101 to 109 from the parameter acquisition unit 503.

In step 702, the overlap region calculation unit 504 selects one standard image I (i, j, m) for which the calculation of the overlap region is desired from a plurality of images stored in the memory unit 502. Here, (i, j) is a variable indicating a coordinate position on the image and m is a variable indicating the number of the standard image, which starts from an initial value 0. The standard image selected in step 702 is a standard image that is selected first and here, an image I (i, j, 0) is selected.

In step 703, the overlap region calculation unit 504 selects one reference image I (i, j, n) to be compared with the standard image. Here, n is a variable indicating the number of the reference image. The reference image selected in step 703 is a reference image that is selected first and the initial value of n is set to n=m+1, and therefore, an image I (i, j, 1) is selected here.

Figure 8:
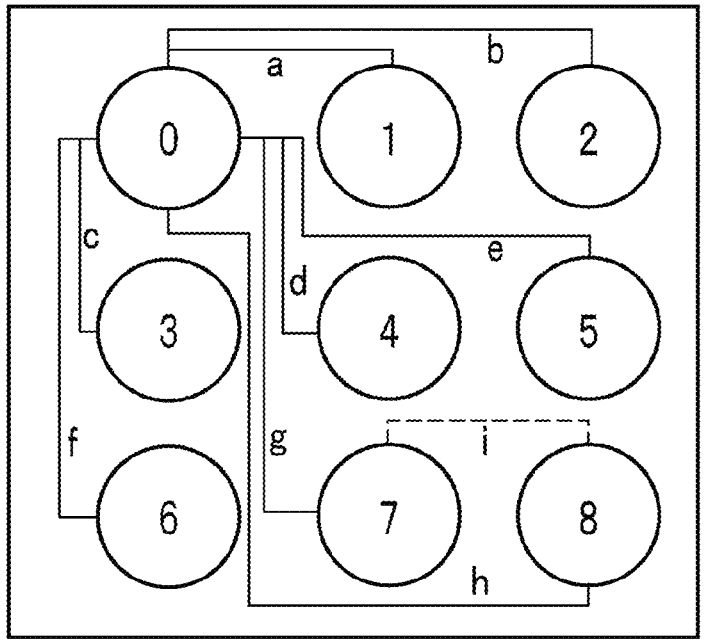
FIG. 8 is a diagram showing an example of a transition process of m and n until all overlap regions are calculated.

In step 707 and step 711 to be described below, the reference image and the standard image are updated, respectively, and in the camera array image capturing device having N image capturing units, the maximum value of m is N−2 and the maximum value of n is N−1. FIG. 8 shows a transition process of m and n until all the overlap regions are calculated in the case of the image capturing device having the nine image capturing units shown in FIG. 1. For example, when m is zero, which is the initial value, n takes values from 1 to 8 and overlap regions are calculated for eight combinations shown by solid lines a to h. Then, this processing is repeated until m becomes (9−2=) 7. For the already acquired combinations, it is not necessary to calculate the overlap region, and therefore, the number of combinations for which the overlap region is calculated decreases one by one as the value of m increases and when m=7, the overlap region of only one combination shown by a dotted line i is calculated.

Here, explanation is returned to the flowchart in FIG. 7.

In step 704, the overlap region calculation unit 504 calculates the overlap region of the selected standard image I (i, j, m) and the reference image (i, j, n) based on the input parameters. In the first step 704 immediately after the processing starts, the overlap region of the standard image (i, j, 0) and the reference image (i, j, 1) is calculated.

FIGS. 9A to 9C are diagrams for explaining the overlap region calculated in step 704. To simplify explanation, a schematic diagram spread in a two-dimensional plane is used. In FIGS. 9A and 9B, the standard image is the image (i, j, 0) acquired by the image capturing unit 101 and the reference image is the image (i, j, 1) acquired by the image capturing unit 102.

FIG. 9A shows the way the image capturing unit 101 and the image capturing unit 102 having the same specifications are arranged side by side with a separation 1x kept in between in an x direction. (Sx, Sy) represent the sensor sizes in (x, y) directions. The focal length of the image capturing unit (distance between lens and sensor) is denoted by ds. The focus position (distance between camera and subject) is denoted by $d_{obj}$. The region surrounded by the dotted line is the image capturing range of the camera, that is, the field angle, and determined by the sensor sizes (Sx, Sy) and the focal length ds. A segment $[P_{10}, P_{21}]$ is a part corresponding to the side of the overlap region in the x (horizontal) direction and a distance wx thereof can be found by Expression (1).

[Expression 1]

$$w_x = \frac{d_{obj}}{d_s} S_x - l_x$$

Expression (1)

FIG. 9B shows an example of the image (captured image range) captured by the image capturing unit 101, the image (captured image range) captured by the image capturing unit 102, and the overlap region of both the images. The region surrounded by four points $[P_{10}, P_{11}, P_{12}, P_{13}]$ is the captured image range of the image capturing unit 101 and the region surrounded by four points $[P_{20}, P_{21}, P_{22}, P_{23}]$ is the captured image range of the image capturing unit 102. Then, the slashed region surrounded by four points $[P_{10}, P_{21}, P_{22}, P_{13}]$ is the overlap region. The segment $[P_{10}, P_{21}]$ corresponds to the side in the x (horizontal) direction of the overlap region on the sensor plane and the number of pixels nw can be found by Expression (2).

[Expression 2]

$$n_w = n_x \left(1 - \frac{d_s l_x}{d_{obj} s_x}\right)$$

Expression (2)

Here, nx is a number of pixels in the horizontal direction of the sensor.

As described previously, the image capturing unit 101 and the image capturing unit 102 are arranged side by side in the x direction, and therefore, in the overlap range in the vertical direction, the pixels in the same number as the number of pixels ny in the vertical direction of the sensor are included as a result.

FIG. 9C shows an example of the overlap region when two cameras are arranged side by side in a y direction. Here, the image (captured image range) captured by the image capturing unit 101, the image (captured image range) captured by the image capturing unit 104, and the overlap region of both the images are shown. The region surrounded by four points $[P_{10}, P_{11}, P_{12}, P_{13}]$ is the captured image range of the image capturing unit 101 and the region surrounded by four points $[P_{30}, P_{31}, P_{32}, P_{33}]$ is the captured image range of the image capturing unit 104. Then, the slashed region surrounded by four points $[P_{30}, P_{31}, P_{12}, P_{13}]$ is the overlap region. A segment $[P_{30}, P_{13}]$ corresponds to the side in the y (vertical) direction of the overlap region on the sensor plane and a number of pixels nh thereof can be found by Expression (3).

[Expression 3]

$$n_h = n_y \left(1 - \frac{d_s l_y}{d_{obj} s_y}\right)$$

Expression (3)

Here, ny is the number of pixels in the vertical direction of the sensor.

As described above, the overlap region of the standard image and the reference image is calculated in step 704.

In step 705, the overlap region calculation unit 504 stores the data of the calculated overlap region in the memory.

In step 706, the overlap region calculation unit 504 determines whether or not the calculation of the overlap region is completed for all the reference images, that is, whether or not n=N−1 is reached. When the calculation of the overlap region is completed for all the reference images, the procedure proceeds to step 708. On the other hand, when there is a reference image not subjected to the processing yet (when n<N−1), the procedure proceeds to step 707.

In step 707, the overlap region calculation unit 504 increments the value of n (n=n+1) and updates the reference image, and the procedure returns to step 704. In this manner, the processing in step 704 to step 706 is repeated until n=N−1 is reached.

In step 708, the overlap region calculation unit 504 calculates a common region in which all the overlap regions obtained about one standard image I (i, j, m) overlap (hereinafter, referred to as a "full overlap region").

Figure 10:
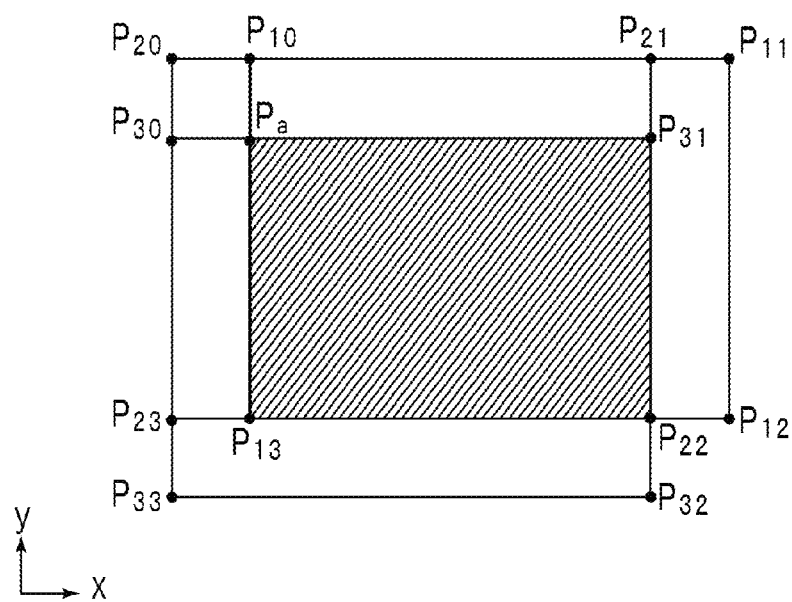
FIG. 10 is a diagram for explaining a full overlap region.

FIG. 10 is a diagram for explaining the full overlap region. Here, for the sake of convenience of explanation, only the captured image regions of the three image capturing units 101, 102, and 104 are shown, but if there are nine image capturing units, the full overlap region of the captured image regions of all the image capturing units is found as a result. The overlap region of the three image capturing units 101, 102, and 104 are as shown in FIGS. 9B and 9C, and therefore, the region in which the two overlap regions overlap, that is, the slashed region surrounded by four points [$P_a$, $P_{31}$, $P_{22}$, $P_{13}$] is the full overlap region in this case.

In step 709, the overlap region calculation unit 504 stores the data of the full overlap region for the one standard image I (i, j, m) obtained in this manner in the memory.

In step 710, the overlap region calculation unit 504 determines whether or not the calculation of the full overlap region is completed for all the standard images, that is, whether or not m=N−2 is reached. When the calculation of the full overlap region is completed for all the standard images, the procedure proceeds to step 712. On the other hand, when there is a standard image not subjected to the processing yet (when m<N−2), the procedure proceeds to step 711.

In step 711, the overlap region calculation unit 504 increments the value of m (m=m+1) and updates the standard image, and the procedure returns to step 703. In the manner, the processing in step 703 to step 710 is repeated until m=N−2 is reached.

In step 712, the overlap region calculation unit 504 outputs the full overlap region for each standard image.

In this manner, the overlap region calculation processing in step 604 of the flowchart in FIG. 6 is performed.

For the sake of convenience of explanation, in FIG. 9 and FIG. 10, the captured image ranges of the standard image and the reference image are shown schematically, but this does not necessarily mean that the calculation processing of the overlap region by the overlap region calculation unit 504 is performed after actually receiving the captured images that are used as the standard image and the reference image. It may also be possible for the overlap region calculation unit 504 to have a configuration in which the overlap region calculation processing is performed after actually receiving the captured images that are used as the standard image and the reference image or the overlap region is calculated after receiving only parameters necessary for the overlap region calculation shown in Expression (1) to Expression (3).

Figure 11:
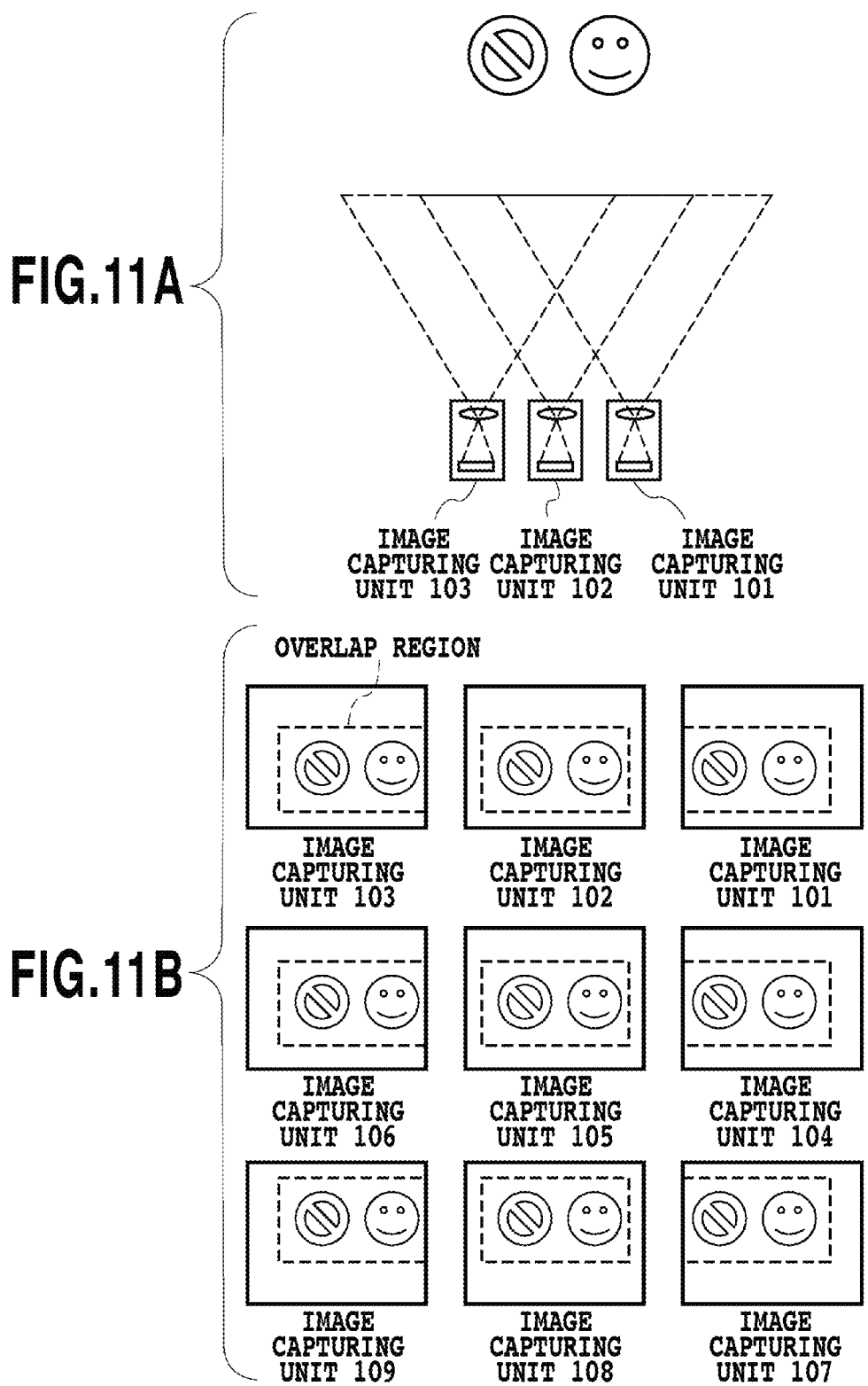
FIGS. 11A and 11B are diagrams showing an example of an overlap region (full overlap region) in the first embodiment.

FIGS. 11A and 11B show an example of the overlap region (full overlap region) obtained when there are nine image capturing units.

FIG. 11A shows a relation between the image capturing units and subjects and two subjects are located in positions the same distance apart from the image capturing units 101 to 103. FIG. 11B shows the respective full overlap regions in the images captured by the nine image capturing units 101 to 109. The region surrounded by the dotted line is the full overlap region by each image capturing unit and by specifying the full overlap region in this manner, the same captured image region is specified from each captured image in a different viewpoint.

<Blurred Image Detection Processing>

Next, details of blurred image detection processing performed in step 606 of the flowchart in FIG. 6 are explained. Before the detailed explanation of the processing, the configuration of the blurred image detection unit 506 of the image processing unit 212 is explained.

Figure 12:
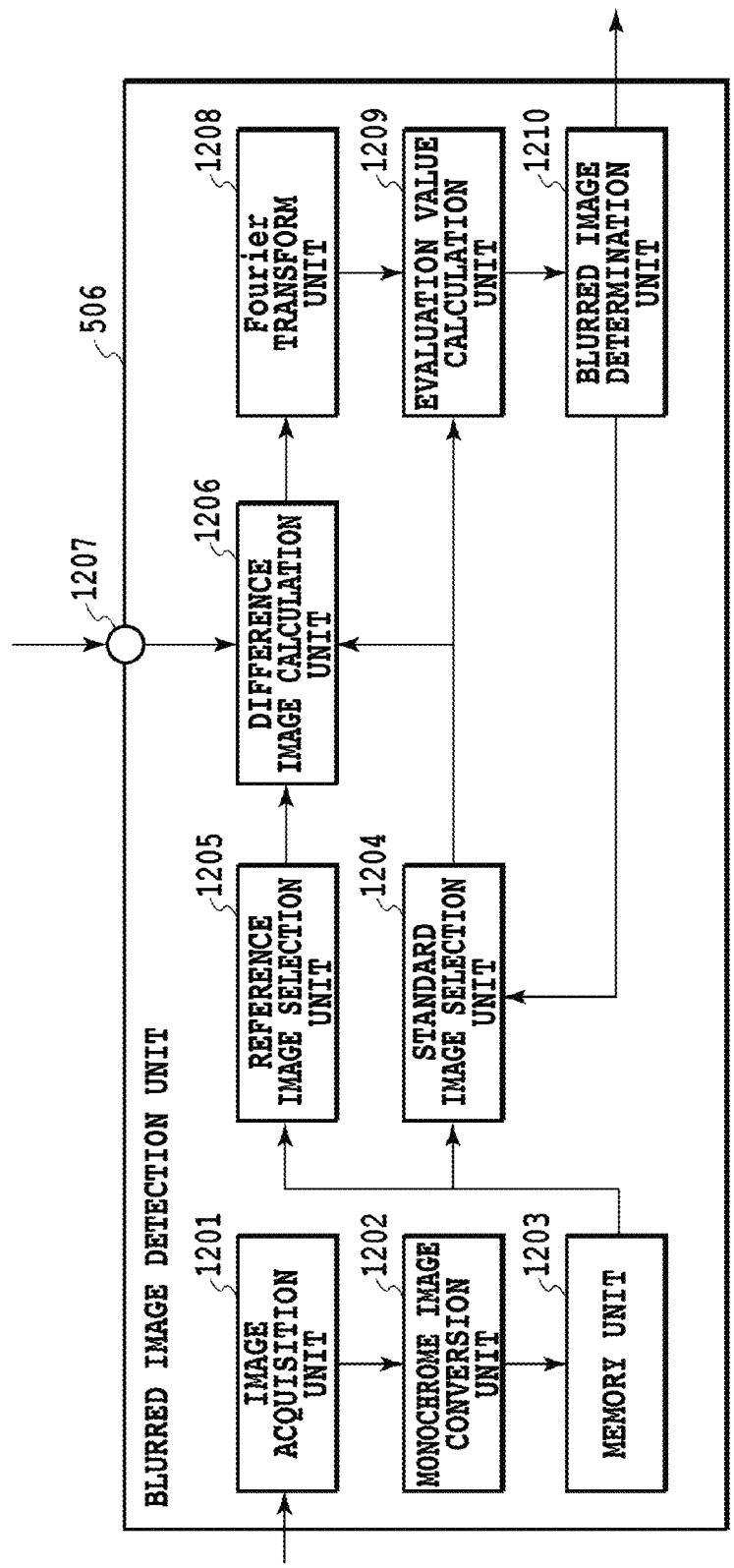
FIG. 12 is a block diagram showing an internal configuration of a blurred image detection unit.

FIG. 12 is a block diagram showing the internal configuration of the blurred image detection unit 506.

Reference numeral 1201 denotes an image acquisition unit, which acquires a plurality of color images clipped by the image clipping unit 505.

Reference numeral 1202 denotes a monochrome image conversion unit, which converts a received color image into a monochrome image. Specifically, the monochrome image conversion unit performs processing to convert a color RGB value into a luminance value.

Reference numeral 1203 denotes a memory unit, which stores a converted monochrome image.

Reference numeral 1204 denotes a standard image selection unit, which selects an image that is used as a standard when detecting a blurred image.

Reference numeral 1205 denotes a reference image selection unit, which selects a reference image to be compared with a standard image when detecting a blurred image.

Reference numeral 1206 denotes a difference image generation unit, which calculates a difference image using a standard image, a reference image, and the shutter speed of an image capturing unit. Information about the shutter speed of an image capturing unit is supplied from a parameter input terminal 1207.

Reference numeral 1208 denotes a Fourier transform unit, which performs Fourier transform on a difference image supplied from the difference image generation unit 1206 to generate a Fourier-transformed image.

Reference numeral 1209 denotes an evaluation value calculation unit, which calculates an evaluation value indicating the degree of similarity to a standard image using the frequency characteristics of a Fourier-transformed image supplied from the Fourier transform unit 1208 and the standard image supplied from the standard image selection unit 1205.

Reference numeral 1210 denotes a blurred image determination unit, which determines a blurred image based on the evaluation value obtained by the evaluation value calculation unit 1209.

In the case of the configuration in which the image clipping unit 505 is omitted, a processing unit configured to acquire a plurality of color images from the memory unit 502 and calculate a region image corresponding to the overlap region given by the overlap region calculation unit 504 is added as a result.

Next, details of blurred image detection processing are explained.

Figure 13:
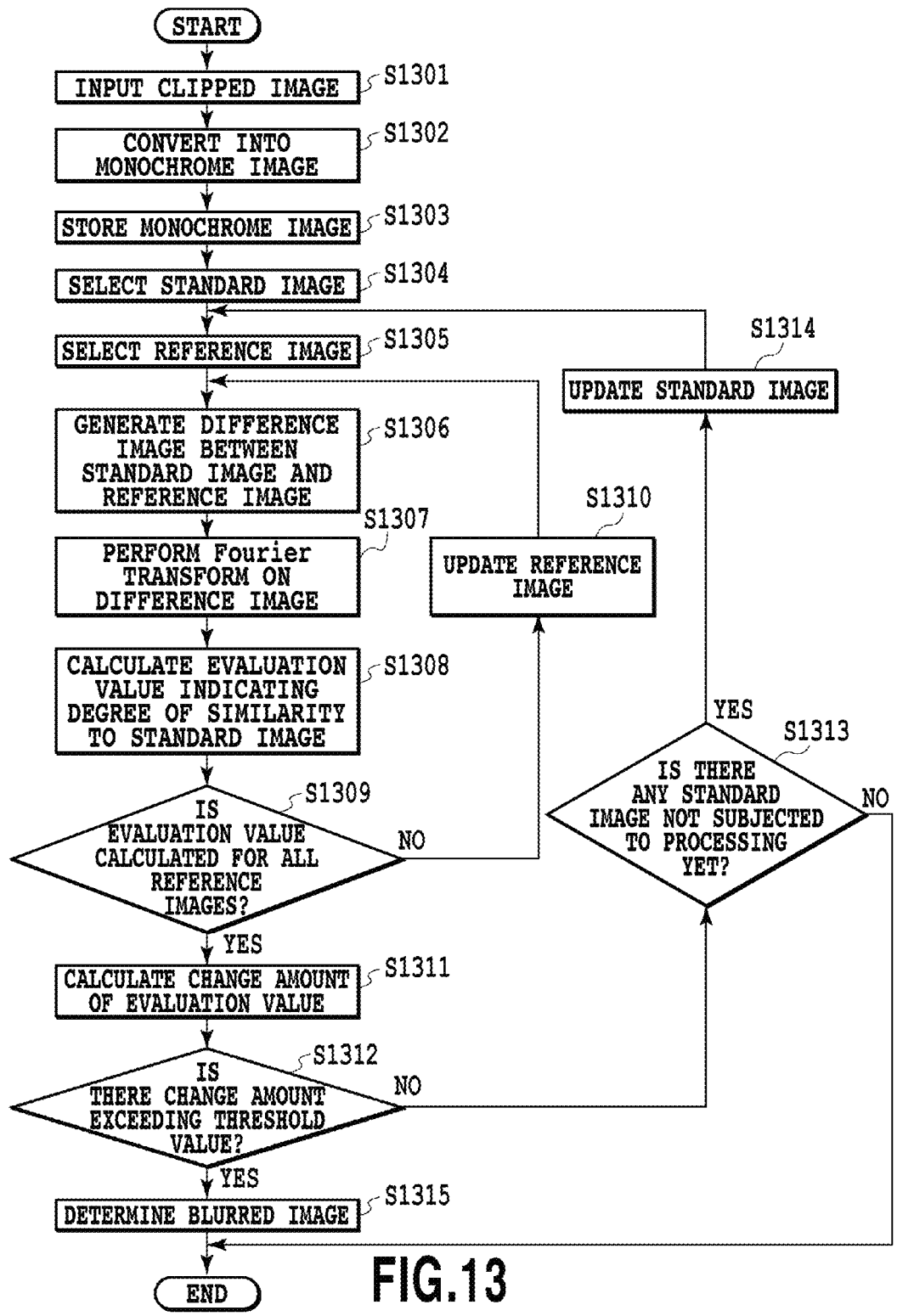
FIG. 13 is a flowchart showing a flow of blurred image detection processing.

FIG. 13 is a flowchart showing a flow of blurred image detection processing.

In step 1301, the image acquisition unit 1301 acquires a plurality of color images clipped by the image clipping unit 505.

In step 1302, the monochrome image conversion unit 1202 converts a color image into a monochrome image. As described above, a color RGB value is converted into a luminance value.

In step 1303, the memory unit 1203 stores a plurality of converted monochrome images.

In step 1304, the standard image selection unit 1204 selects a standard image I' (i, j, m) used when detecting a blurred image. Here, I' indicates that the image is an image after being clipped. Here, (i, j) is a variable indicating a coordinate position on the image and m is a variable indicating the number of the standard image and in the camera array image capturing device having N image capturing units, m takes values from 0 to N−2. In this step, the number of the variable m is assigned so that the image capturing unit is selected in order from that with the fastest shutter speed. The reason for that is described later. Among the image capturing units 101 to 109 in the present embodiment, the shutter speed of the image capturing unit 101 is the fastest, and therefore, the image acquired by the image capturing unit 101 is selected as the first standard image.

In step 1305, the reference image selection unit 1205 selects a reference image I' (i, j, n) that is object to be compared when detecting a blurred image. Here, n is a variable indicating the number of the reference image and n takes values from 1 to N−1. The reference image selected in step 1305 is the reference image that is selected first and the initial value of n is set to n=m+1, and therefore, the image I' (i, j, 1) is selected here.

FIGS. 14A to 14E show an example of a clipped image captured by the image capturing units 101 to 105 (the images captured by the image capturing units 106 to 109 are omitted for simplification) and converted into a monochrome image.

Figure 14A:
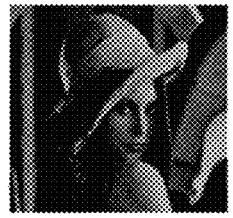
FIGS. 14A to 14E are diagrams showing an example of a clipped image converted into a monochrome image.
Figure 14B:
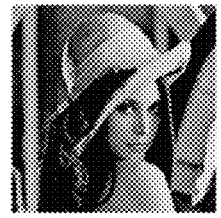
Figure 14C:
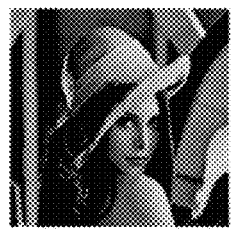
Figure 14D:
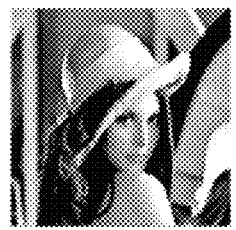
Figure 14E:

FIG. 14A shows an mage captured by the image capturing unit 101 with the fastest shutter speed and selected as the standard image I' (i, j, m). FIG. 14B shows an image captured by the image capturing unit 102, FIG. 14C shows an image captured by the image capturing unit 103, FIG. 14D shows an image captured by the image capturing unit 104, and FIG. 14E shows an image captured by the image capturing unit 105, and all these images are selected as the reference image I' (i, j, n). Each image of FIGS. 14A to 14C captured by the image capturing units (the image capturing units 101 to 103) with the faster shutter speed includes no blur. On the other hand, each image of FIGS. 14D and 14E captured by the image capturing units (the image capturing units 104 and 105) with the slower shutter speed includes a blur. In FIGS. 14A to 14E, the captured images of the image capturing units 106 to 109 are omitted. However, it is possible to infer that the captured images of the image capturing units 106 to 109 which are captured with the shutter speeds slower than that of the image capturing unit 105 include a blur because the images captured by the image capturing units 104 and 105 include a blur. From FIGS. 14D and 14E, it can also be seen that there is a tendency for the image captured with the faster shutter speed to be darker on the whole.

Explanation is returned to the flowchart in FIG. 13.

When the standard image and the reference image are determined through steps 1304 and 1305, the difference image generation unit 1206 generates a difference image E (i, j, n) in step 1306. The difference image E (i, j, n) is generated by the calculation using Expression (4).

[Expression 4]

$$E(i, j, n) = \left| \frac{I'(i, j, n)}{Tv(n)} - \frac{I'(i, j, m)}{Tv(m)} \right| \qquad \text{Expression (4)}$$

Here, Tv(m) is a shutter speed of the standard image m and Tv(n) is a shutter speed of the reference image n. In this case, the shutter speed when capturing the standard image differs from the shutter speed when capturing the reference image, and therefore, it is necessary to make the brightness of both images identical. Because of this, processing is performed so as to adjust the luminance of the standard image and the reference image so that the value of both Tv(m) and Tv(n) is one in Expression (4) described above.

Figure 15:
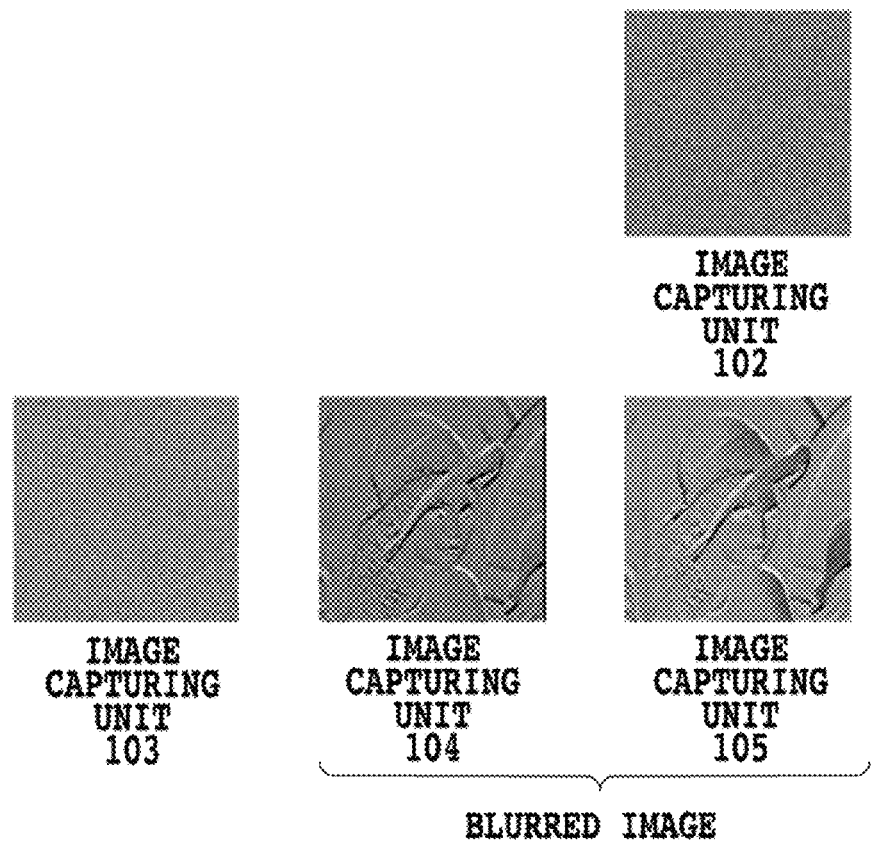
FIG. 15 is a diagram showing an example of a difference image.

FIG. 15 is a diagram showing the difference image E (i, j, n) of each of the reference images (FIGS. 14B to 14E) generated using the standard image (FIG. 14A). It is possible to confirm that while the difference images of the image capturing units 102 and 103 are images with uniform noise, the image of the edge part of the subject remains in the difference images of the image capturing units 104 and 105. The difference images of the image capturing units 102 and 103 are images with uniform noise because of the influence of noise of the image capturing element.

As is obvious from FIG. 15, a clear difference arises between the difference images obtained from the images with no blur of the image capturing units 102 and 103 and the difference images obtained from the images including a blur of the image capturing units 104 and 105. In order to evaluate the degree of a blur, processing to find an evaluation value E (n) is performed.

As processing in the previous stage to find the evaluation value E (n), in step 1307, the Fourier transform unit 1208 performs Fourier transform on the generated difference image E (i, j, n). Specifically, an image PE (u, v, n) representing the power of Fourier transform is calculated based on Expression (5).

[Expression 5]

$$PE(u,v,n) = \|FFT(E(i,j,n))\| \qquad \text{Expression (5)}$$

FFT ( ) is a function that performs two-dimensional Fourier transform.

Figure 16:
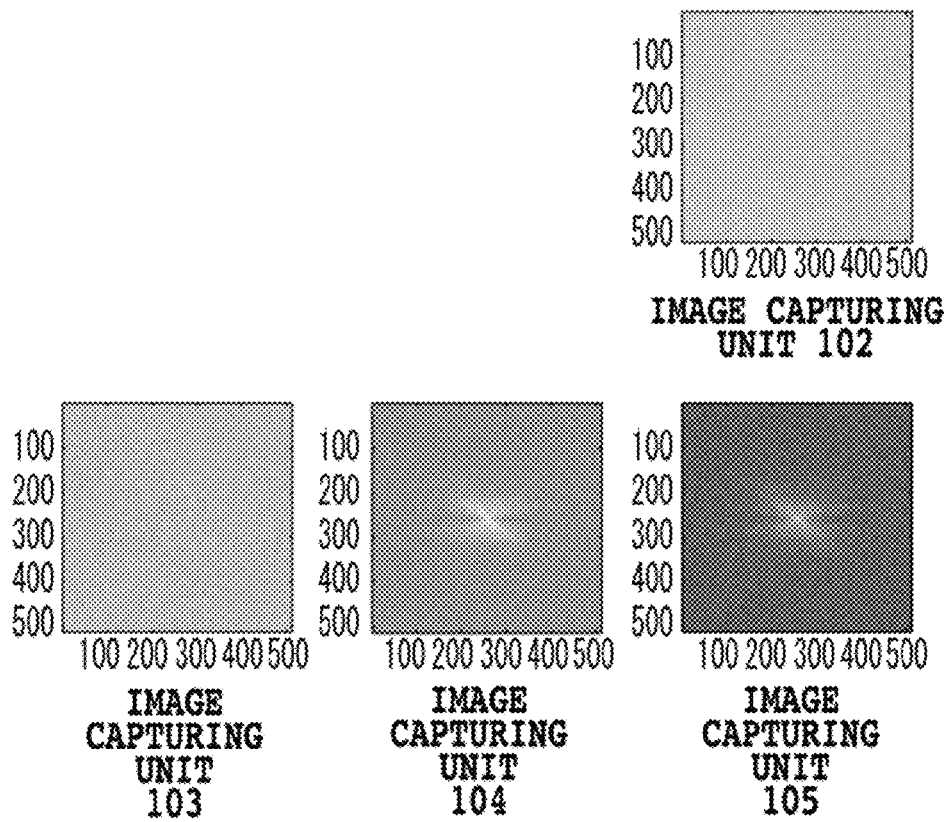
FIG. 16 is a diagram showing an example of a power image.

FIG. 16 is a diagram showing power images PE (i, j, n) obtained for each difference image shown in FIG. 15. The center part of the power image indicates low frequencies and the more distant from the image center, the higher the frequency becomes. The intensity of the frequency is represented by the density of the image and the part where luminance is high indicates that many components of the corresponding frequency are included in the image. From FIG. 16, it can be seen that while the power images of the image capturing units 102 and 103 indicate a uniform distribution of frequency, the power images of the image capturing units 104 and 105 include many frequency components in low frequencies.

Next, in step 1308, the evaluation value calculation unit 1209 calculates the evaluation value E (n) indicating the degree of similarity to the standard image using the power image PE (u, v, n) that is found. The evaluation value E (n) is calculated using Expression (6).

[Expression 6]

$$E(n) = \sum_{u=1}^{N_u} \sum_{v=1}^{N_v} E'(u, v) \qquad \text{Expression (6)}$$

Here, it is assumed that

E' (u, v)=1 (when PE (u, v, n)>Th0) and

E' (u, v)=0 (other than the above). Here, (u, v) indicates the coordinate position in the Fourier space. (Nu, Nv) are the numbers of elements in the (u, v) directions of the power image PE (u, v, n) of the difference image. Here, the value of both Nu and Nv is set to 512.

Expression (6) means the frequency of the power P (u, v, n) of the difference image that exceeds a threshold value Th0. Here, the threshold value Th0 indicates the average of the powers of the standard images and is derived by Expression (7) and Expression (8).

[Expression 7]

$$Th0 = \frac{1}{N_u N_v} \sum_{u=1}^{N_u} \sum_{v=1}^{N_v} P(u, v, m) \qquad \text{Expression (7)}$$

[Expression 8]

$$P(u, v, n) = \|FFT(I(i, j, n))\| \qquad \text{Expression (8)}$$

In step 1309, the reference image selection unit 1205 determines whether or not the calculation of the evaluation value E (n) indicating the degree of similarity to the standard image is completed for all the reference images I' (i, j, n). When it is determined that the calculation processing of the evaluation value is completed for all the reference images, the procedure proceeds to step 1311. On the other hand, when there is a reference image not subjected to the processing yet, the procedure proceeds to step 1310.

In step 1310, the reference image selection unit 1205 performs processing to update the reference image (to increment the value of the variable n indicating the number of the reference image) and the procedure returns to step 1306. Then, the processing in step 1306 to step 1310 is repeated until the evaluation value is calculated for all the reference images.

In this manner, the evaluation value E (n) indicating the degree of similarity to the standard image is calculated. The evaluation value E (n) calculated based on each image shown in FIG. 14 to FIG. 16 is as follows, E (2)=144,
E (3)=288,
E (4)=14121, and
E (5)=23636.

The evaluation values of the image capturing units 104 and 105 the captured images of which include a blur are clearly larger than the evaluation values of the image capturing units 102 and 103.

Explanation is returned to the flowchart in FIG. 13.

When the calculation of evaluation value is completed for all the reference images, the blurred image determination unit 1210 calculates a change amount Ed (n) of the evaluation value in step 1311. The change amount Ed (n) is found by Expression (9).

$$Ed(n)=E(n+1)/E(n) \qquad \text{Expression (9)}$$

For example, if the change amount of the specific example of the evaluation value described above, that is, E (2)=144, E (3)=288, E (4)=14121, and E (5)=23636 is calculated, the result will be as follows.

Ed (2)=2.0,
Ed (3)=49.0, and
Ed (4)=1.7.

When the calculation of the change amount as described above is completed, in step 1312, the blurred image determination unit 1210 determines whether or not a predetermined threshold value Th1 is exceeded by one or more of the change amounts Ed (n). The value of the predetermined threshold value Th1 is set in advance based on empirical rules and here, it is assumed that Th1=40 is set. In the example described above, Ed (3)=49.0 and Ed (n)>Th1, and therefore, it is determined that one or more of the change amounts Ed (n) exceed the threshold value Th1 as a result. When it is determined that one or more of the change amounts Ed (n) exceed the threshold value Th1, the procedure proceeds to step 1315. On the other hand, when it is determined that none of the change amounts Ed (n) exceeds the threshold value Th1, the procedure proceeds to step 1313.

In step 1313, the blurred image determination unit 1210 determines whether or not there is a standard image not subjected to the processing yet. When there is a standard image not subjected to the processing yet, the procedure proceeds to step 1314. On the other hand, when there is not a standard image not subjected to the processing yet, the present processing is exited. The fact that it is determined that there is not a standard image not subjected to the processing yet in this step and the present processing is exited means that no blurred image is detected.

In step 1314, the blurred image determination unit 1210 performs processing to update the standard image (to increment the value of the variable m indicating the number of the standard image) and the procedure returns to step 1305. Then, the processing in step 1305 to step 1313 is repeated until it is determined that one or more of the change amounts Ed (n) exceed the threshold value Th1 in step 1312 or it is determined there is not a standard image not subjected to the processing yet in step 1313.

In step 1315, the blurred image determination unit 1210 determines a blurred image. Specifically, all the captured images, which are the captured images of the image capturing units corresponding to n that satisfies Ed (n)>Th1 and the captured images by the image capturing units with the slower shutter speed than that of the image capturing unit in question, are determined to be the images including a blur. In the example described above, the captured images of the image capturing units 104 to 109 are determined to be the images including a blur as a result. To put it the other way around, this means that the captured images of the image capturing units 101 to 103 are determined to be images including no blur.

The reason for that the number of the variable m is assigned so that the image capturing units are selected in the order from that with the fastest shutter speed in step 1304 is as follows.

For example, when the feature amount of the subject is not at all included in the standard image, it is absolutely impossible for the change amount of the evaluation value to be determined to exceed the threshold value Th1 by the determination processing in step 1312. The situation in which the feature amount of the subject is not at all included in the standard image occurs when the shutter speed of the image capturing unit that captures the standard image is too fast compared to the brightness of the image capturing condition. When the shutter speed is too fast, the captured image is dark as pitch (very dark) and the blur component included in the image cannot be detected even by calculating the difference image between the captured image and the reference image. On the other hand, the lower the shutter speed, the stronger the possibility that a blur is included in the image becomes. Consequently, it is made possible to select a captured image that includes the feature amount of a subject but no blur as a standard image by setting the standard image in order from the image with the fastest shutter speed.

The details of the blurred image detection processing are as above.

As shown by Expression (9), in step 1311, the change amount Ed (n) of the evaluation value is calculated by the ratio of the evaluation values between the previous and the subsequent reference images, but, it may also be possible to adopt another evaluation value as long as the calculation method thereof is a method capable of confirming the change of the evaluation value. For example, it may also be possible to use an absolute value of the difference between the evaluation values of the previous and the subsequent images as shown by Expression (10) below.

$$Ed(n)=|E(n+1)-E(n)| \qquad \text{Expression (10)}$$

When the processing is performed for all the standard images and as a result of that if there is no amount change of the evaluation value that satisfies the set threshold value Th1, the blurred image detection processing is exited without no image including a blur is determined as a result. When no image including a blur is detected as described above, it is conceivable to immediately move to the processing of the output image regarding that there is no blurred image, but, it may also be possible to perform the blurred image detection processing again after, for example, changing the value of the threshold value Th1. Specifically, for example, it is conceivable to determine in advance the lower limit value of the threshold value Th1 that can be set and to set again a value with which an image including a blur can be detected while taking into account the value of the change amount Ed (n) obtained by the previous detection processing. Then, it may also be possible for the new threshold value Th1 to be set automatically according to a predetermined rule set in advance or to enable a user to set an arbitrary value via the operation unit 205 or the display unit 206.

In the present embodiment, the evaluation value used when detecting a blurred image is calculated while paying attention to the frequency characteristics of the difference image between the standard image and the reference image, but, another evaluation value may be used. For example, it may also be possible to divide the region of the difference image shown in FIG. 15 into several blocks, find an average (or variance) of the pixel values in each region, then find a variance of the averages (or variances) of each region, and adopt the variance as the evaluation value E (n) indicating the degree of similarity to the standard image. In such a case, the value of the threshold value Th1 is also set to a value corresponding to the evaluation value E (n). That is, the evaluation value is not limited to the frequency characteristics as long as the blur component can be detected from the difference image between the standard image and the reference image by the evaluation value.

In the present embodiment, the configuration and processing of each unit are explained on the assumption that all the images captured by the image capturing units 101 to 109 are color images. However, it may also be possible to change part of or all the images captured by the image capturing units 101 to 109 to monochrome images. In such a case, the color filter 308 in FIG. 3, the monochrome image conversion unit 1202 in FIG. 12, and the conversion processing into a monochrome image (step 1302) in the flowchart in FIG. 13 are omitted.

In the flowchart in FIG. 13, the case is explained where a blurred image is detected based on the image clipped by the image clipping unit 505, but, as previously described, the processing to detect a blurred image according to the present embodiment is not limited to this. That is, for example, it may also be possible to acquire the overlap region calculated by the overlap region calculation unit 504 and a plurality of captured images stored in the memory unit 502 and to calculate a region image corresponding to the overlap region in the captured image prior to conversion into a monochrome image.

As explained above, according to the present embodiment, it is made possible to provide an excellent image including no blur from a plurality of images acquired by the camera array image capturing device.

Second Embodiment

In the first embodiment, parameters relating to the image capturing unit are acquired and a corresponding image is clipped after calculating the overlap region of each captured image according to the parameters. Next, an aspect in which the overlap region is calculated in advance and an image is clipped using the calculation result is explained as a second embodiment. Explanation of the parts common to those in the first embodiment is simplified or omitted and here, different points are explained mainly.

<Configuration Diagram of Image Processing Unit>

Figure 17:
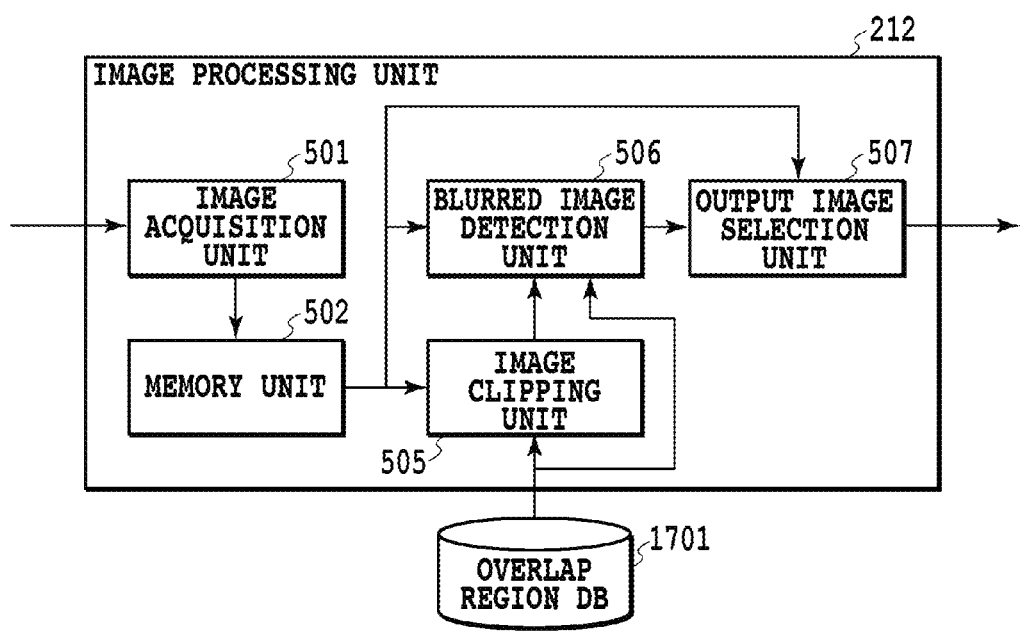
FIG. 17 is a block diagram showing an internal configuration of an image processing unit according to a second embodiment.

FIG. 17 is a block diagram showing an internal configuration of the image processing unit 212 according to the present embodiment. In the image processing unit 212 shown in FIG. 17, neither the parameter acquisition unit 503 nor the overlap region calculation unit 504 is provided. Instead, an overlap region database 1701 is provided and configuration is such that it is possible for the image clipping unit 505 to acquire data of the overlap region from the overlap region database 1701. The data of the overlap region stored in the overlap region database 1701 is calculated in advance by the overlap region calculation processing explained in the first embodiment.

Figure 18:
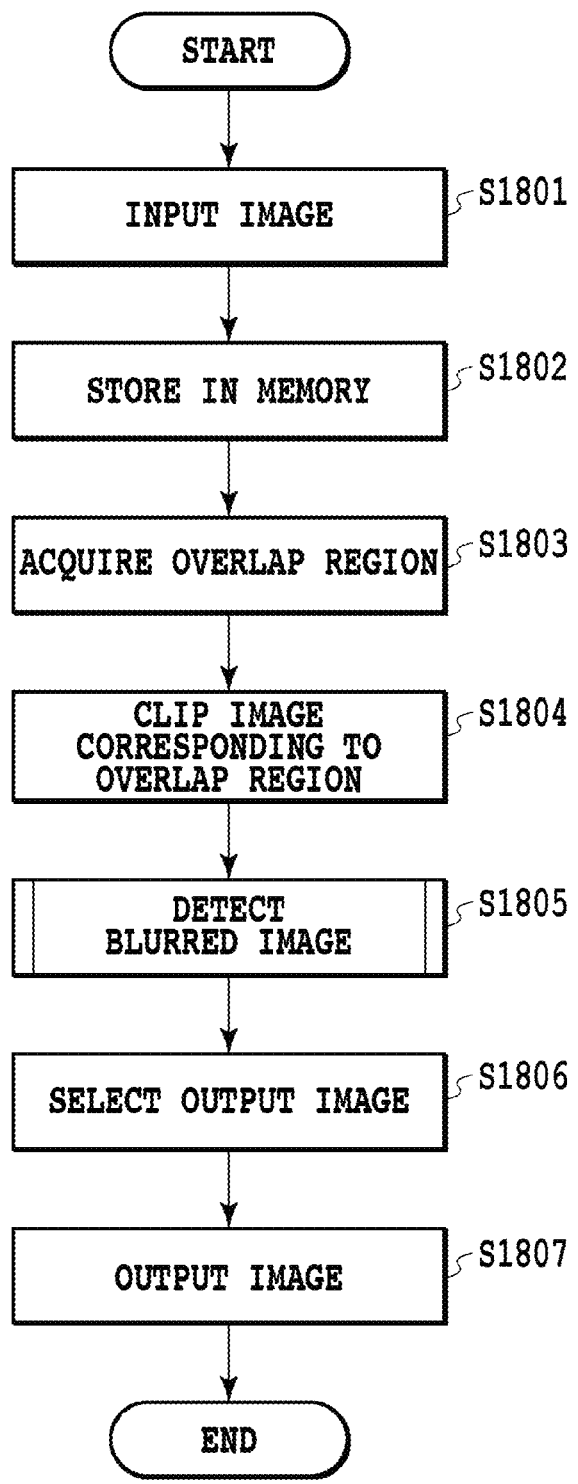
FIG. 18 is a flowchart showing a flow of processing in the image processing unit according to the second embodiment.

FIG. 18 is a flowchart showing a flow of processing in the image processing unit 212 according to the present embodiment.

Steps 1801 and 1802 are the same as steps 601 and 602 in the flowchart in FIG. 6 according to the first embodiment.

When the data of an input color image is stored in the memory unit 502, the image clipping unit 505 acquires the data of the overlap region from the overlap region database 1701 in step 1801.

In step 1804, the image clipping unit 505 performs processing to clip a region image corresponding to the overlap region on a plurality of color images stored in the memory unit 502 using the acquired data of the overlap region.

Step 1805 to step 1807 are the same as steps 606 to 608 in the flowchart in FIG. 6 of the first embodiment.

As in the case of the first embodiment, it is needless to say that the present embodiment is not limited to the aspect in which a blurred image is detected based on the region image clipped by the image clipping unit 505. That is, instead of performing image clipping processing, it may also be possible to acquire the data of the overlap region from the overlap region database 1701, acquire a plurality of captured images stored in the memory unit 502, and calculate a region image corresponding to the overlap region in the captured image.

As explained above, according to the present embodiment, image clipping processing is performed using the overlap region prepared in advance, and therefore, it is possible to simplify the processing performed by the image processing unit 212.

Third Embodiment

In the first and second embodiments, one image (for example, an image captured with the slowest shutter speed) is selected from a plurality of images determined to include no blur and output as an image with no blur. Next, an aspect in which an image with no blur is provided using all the images determined to include no blur is explained as a third embodiment. Explanation of the parts common to those of the already described first and second embodiments is simplified or omitted and here, different points are explained mainly.

<Configuration Diagram of Image Processing Unit>

Figure 19:
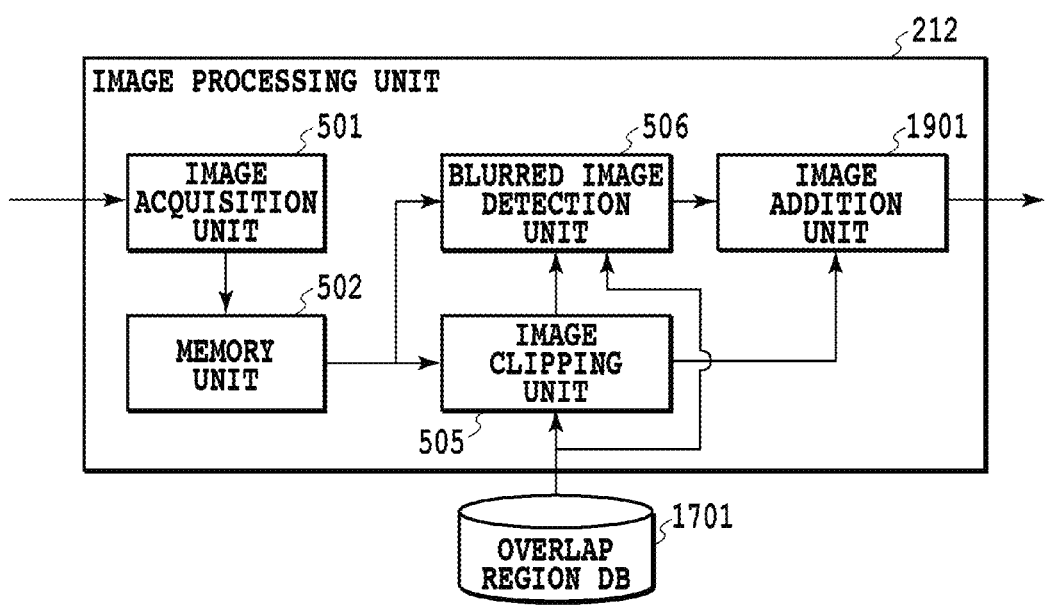
FIG. 19 is a block diagram showing an internal configuration of an image processing unit according to a third embodiment.

FIG. 19 is a block diagram showing an internal configuration of the image processing unit 212 according to the present embodiment. The image processing unit 212 shown in FIG. 19 differs from the image processing unit 212 in FIG. 17 according to the second embodiment in that an image addition unit 1901 is provided instead of the output image selection unit 507.

The image addition unit 1901 performs weighting addition processing on an image corresponding to an image determined to include no blur by the blurred image detection unit 506 of the images clipped by the image clipping unit 505.

For the sake of simplification of explanation, explanation is given by comparison with the image processing unit 212 according to the second embodiment, but, such a configuration may be accepted in which the image addition unit 1901 is provided in place of the output image selection unit 407 of the image processing unit 212 according to the first embodiment.

Figure 20:
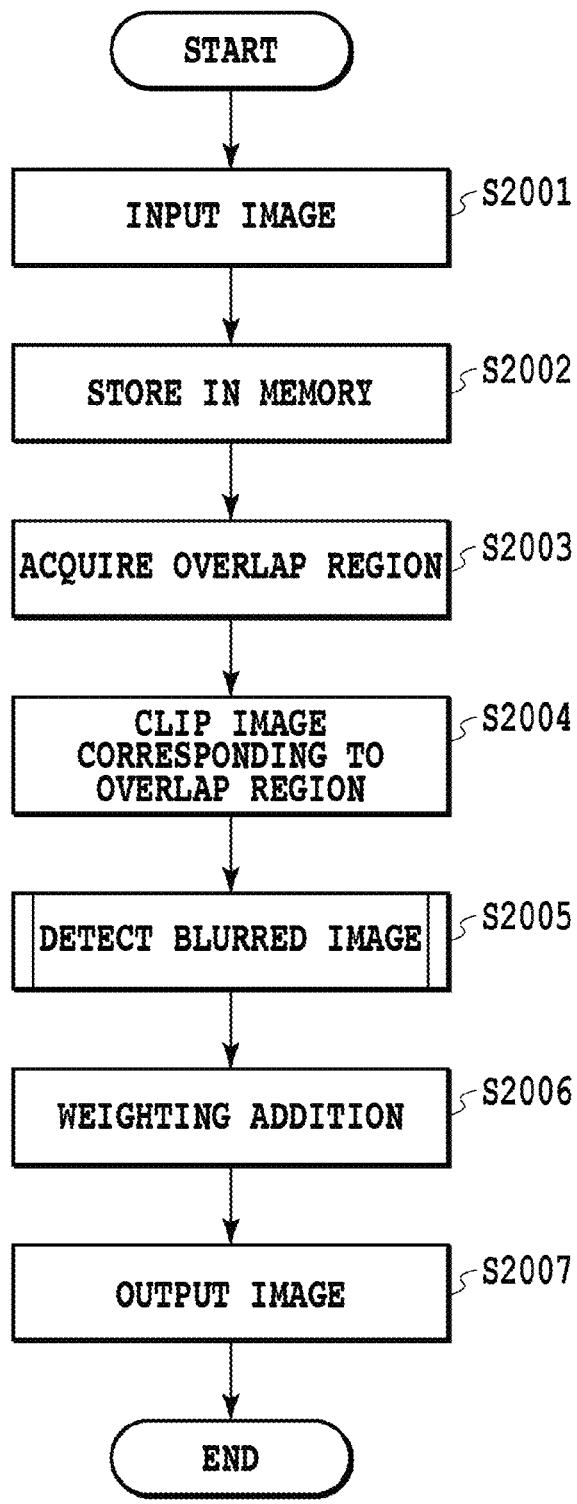
FIG. 20 is a flowchart showing a flow of processing in the image processing unit according to the third embodiment.

FIG. 20 is a flowchart showing a flow of processing in the image processing unit 212 according to the present embodiment.

Steps 2001 to 2005 are the same as steps 1801 to 1805 in the flowchart in FIG. 18 according to the second embodiment.

When blurred image detection processing is completed, in step 2006, the image addition unit 1901 refers to the detection result and perform weighting addition on an image including no blur of the region images clipped by the image clipping unit 505. In the examples shown in FIG. 14 to FIG. 16, the captured images by the image capturing unit 102 and the image capturing unit 103 include no blur, and therefore, the weighting addition processing is performed on these clipped images. The weighting addition processing is performed using Expression (11).

$$Iw(i,j) = \Sigma(w(n) \times I'(i,j,n))$$  Expression (11)

Here, Iw (i, j) is a weight-added image, w (n) is a weight coefficient for the reference image I' (i, j, n), and n is a variable indicating the number of the reference image, indicating the number of a reference image determined to include no blur. The value of the weight coefficient w (n) may be set to a different value for each shutter speed Tv (n) or to a fixed value (for example, w (n)=1) to perform uniform weighting addition.

Further, instead of performing weighting addition on all the region images determined to include no blur, it may also be possible to set the weight coefficient for a specific region image to zero to exclude the specific region image from the region images used for weighting addition processing.

The image obtained by performing weighting addition processing on the region image determined to include no blur in this manner is output as an output image.

As explained above, according to the present embodiment, the output image is generated using more images, and therefore, it is made possible to provide an image with no blur in which noise is further suppressed.

Fourth Embodiment

In the first to third embodiments, the case is supposed where a plurality of subjects is located at the same distance from the image capturing units (see FIG. 11A). Here, a method for dealing with a case where a plurality of subjects is located at different distances from the image capturing units is explained as a fourth embodiment. Explanation of the parts common to those of the already described first to third embodiments is simplified or omitted and here, different points are explained mainly.

Figure 21:
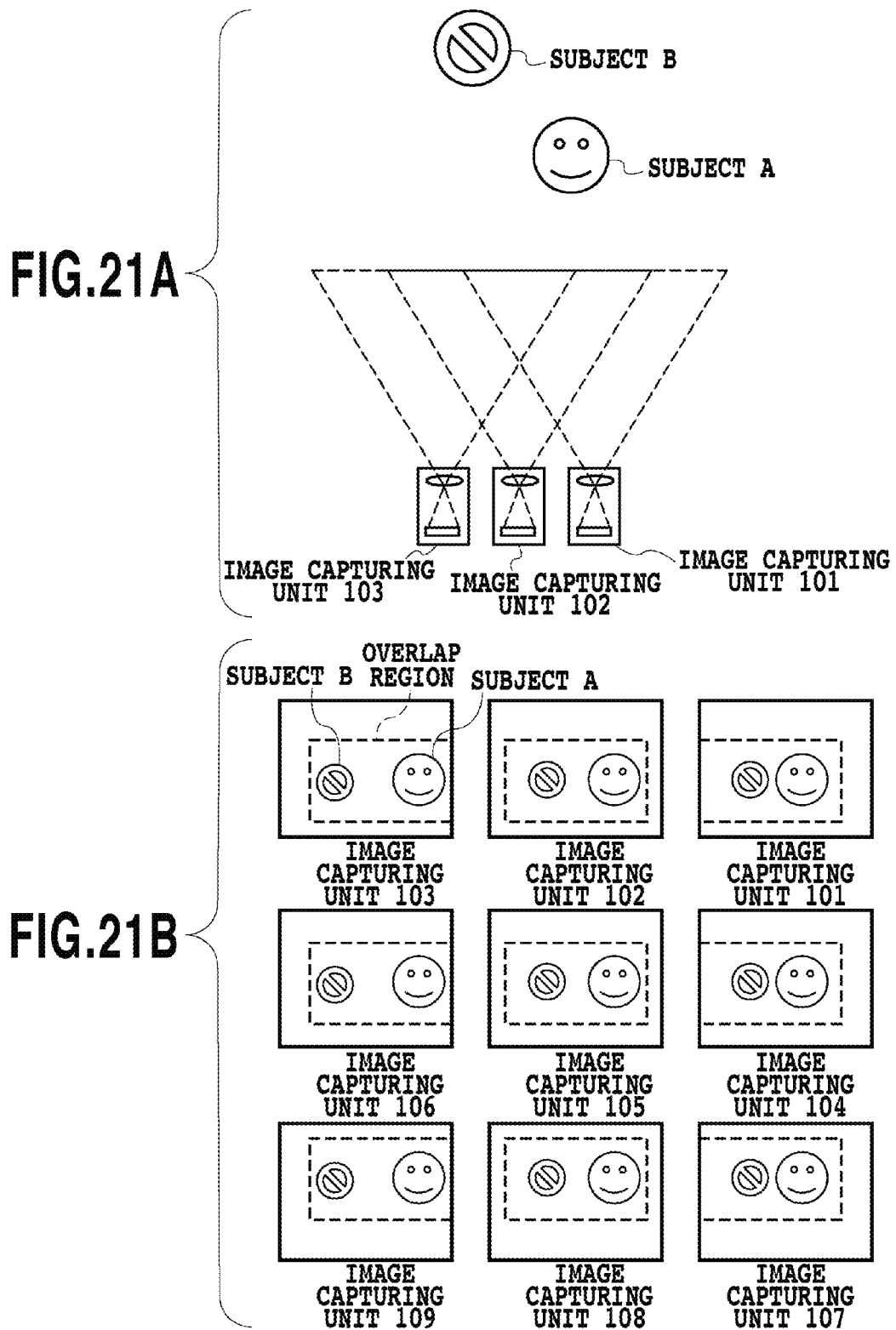
FIGS. 21A and 21B are diagrams showing an example of an overlap region (full overlap region) in a fourth embodiment.

FIGS. 21A and 21B show an example of overlap regions (full overlap regions) obtained when there are nine image capturing units.

FIG. 21A shows a relation between the image capturing units and subjects and the two subjects are located at different distances (subject B is more distant than subject A) from the image capturing units 101 to 103. FIG. 21B shows the full overlap regions in the images captured by the nine image capturing units 101 to 109, respectively. In FIG. 21B, from comparison between the overlap region of the image capturing unit 101 and the overlap region of the image capturing unit 103, it is obvious that the separations between the subjects A and B are different. When the two subjects are located at different distances as described above, it is possible to confirm that the separation between the two subjects on a region sensor plane differs depending on the image capturing unit. In the present embodiment, a blurred image is detected by taking into account a positional difference (parallax) on the sensor plane that arises depending on the distance between the image capturing unit and the subject.

<Blurred Image Detection Processing>

The configuration of the blurred image detection unit 506 according to the present embodiment is the same as that in FIG. 12 explained in the first embodiment. A difference lies in the contents of the calculation processing in the difference image generation unit 1206. That is, the contents of the processing to generate the difference image between the standard image and the reference image in step 1306 in the flowchart of FIG. 13 are different from those in the first embodiment.

Figure 22:
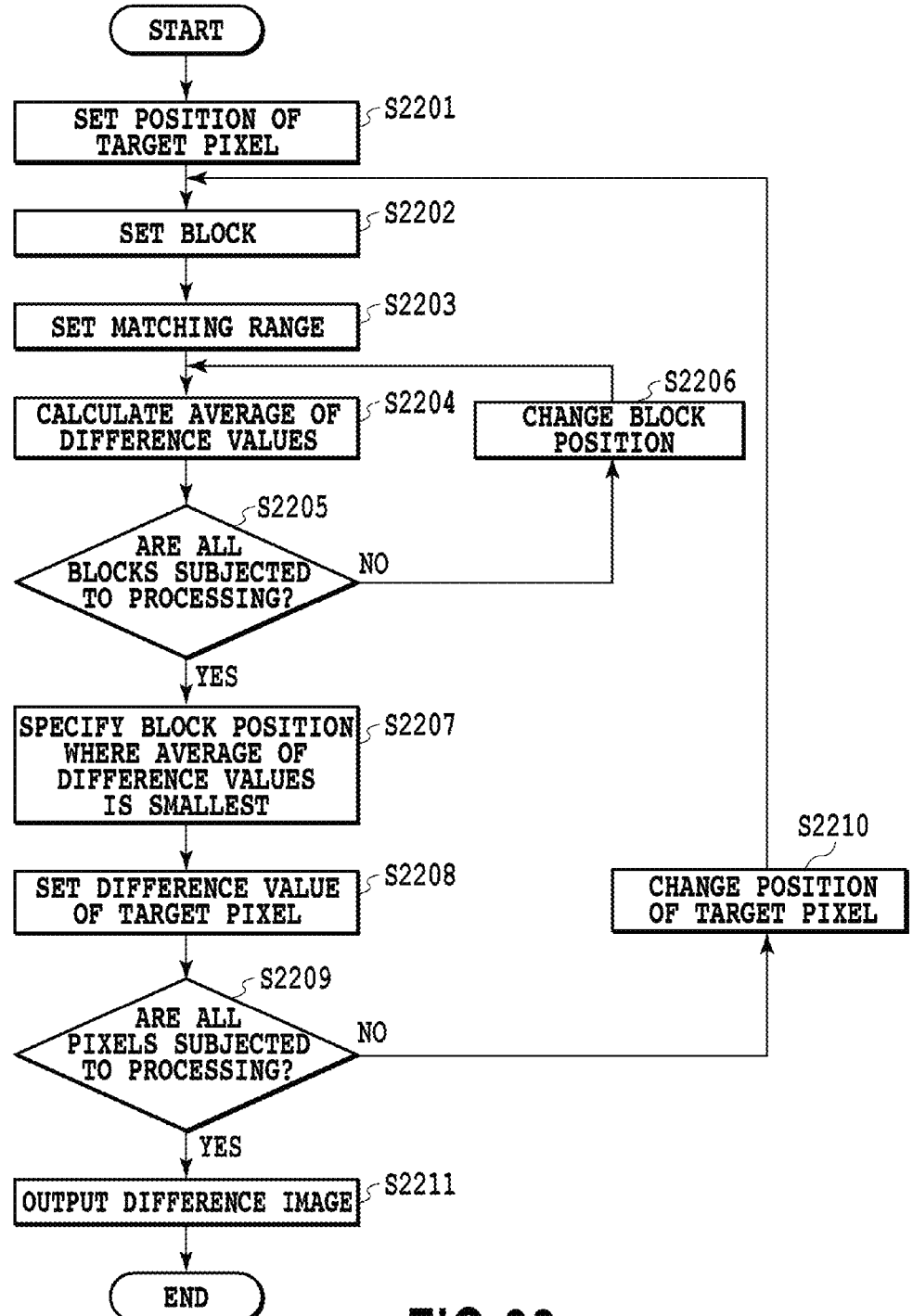
FIG. 22 is a flowchart showing a flow of difference image generation processing in the fourth embodiment.

FIG. 22 is a flowchart showing a flow of the difference image generation processing in the present embodiment.

The characteristics of the difference image generation processing are that difference values of adjacent pixels (pixels in the vicinity) of a target pixel position are found and a pixel position the difference value of which is smallest is adopted as a difference image. Detailed explanation is given below.

In step 2201, the difference image generation unit 1206 sets a position (i, j) of a target pixel used to calculate a difference image in the standard image and the reference image.

In step 2202, the difference image generation unit 1206 sets a predetermined block (block used to find a difference value) with the set target pixel as a center and a center position (ii, jj) of the block in the reference image.

In step 2203, the difference image generation unit 1206 sets a range in which block matching is performed. The range in which block matching is performed may be set to an arbitrary extent in view of the calculation costs, but, the position (i, j) of the target pixel must be included therein. In general, when parallax is large, it is preferable to set a large range in which block matching is performed and conversely, when parallax is small, a small range in which block matching is performed is sufficient.

Figure 23:
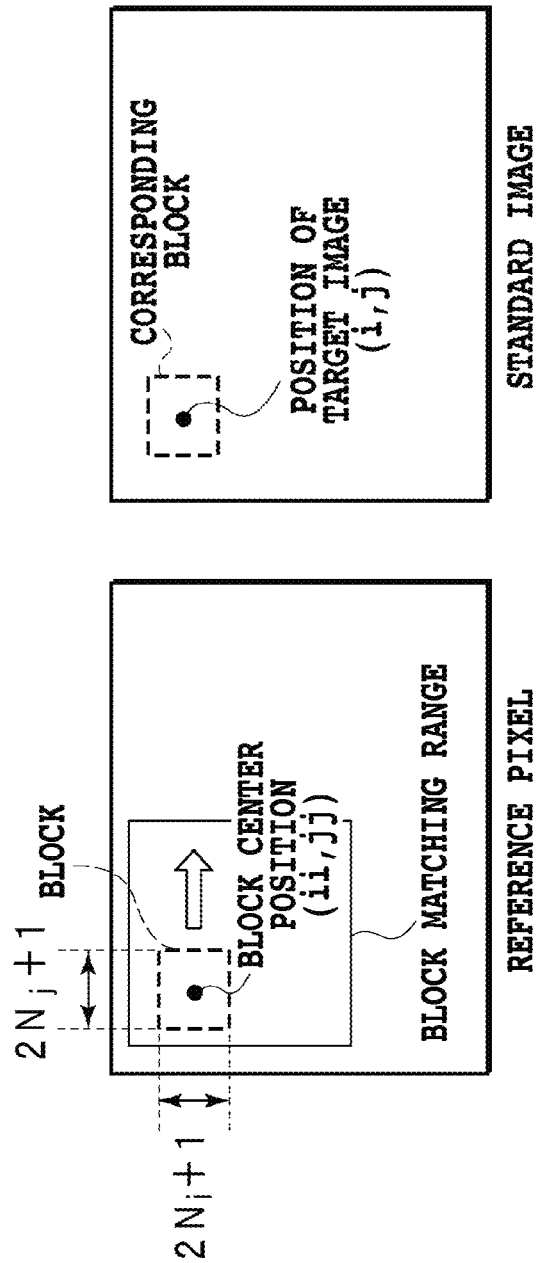
FIG. 23 is a diagram showing a position of a target pixel, a block set in a reference image, a center position of the block, and a set range in which block matching is performed.

FIG. 23 is a diagram showing the position (i, j) of the target pixel, the block set in the reference image, the center position of the block, and the set range in which block matching is performed. In this case, the block is the size defined by 2Ni+1 pixels in the vertical direction and 2Nj+1 pixels in the horizontal direction, where Ni and Nj are integers not less than zero, respectively.

In step 2204, the difference image generation unit 1206 calculates an average of difference values using the standard image and the reference image in the range of the set block. Expression (12) is a calculation expression to find an average Eave (ii, jj, n) of difference values in the center position (ii, jj) of the block.

[Expression 12]

$$E_{ave}(ii, jj, n) = \frac{1}{(2N_i + 1)(2N_j + 1)} \sum_{a=-Ni}^{Ni} \sum_{b=-Nj}^{Nj} \left| \frac{I'(i+ii+a, j+jj+b, n)}{Tv(n)} - \frac{I'(i, j, m)}{Tv(m)} \right|$$  Expression (12)

Here, I' (i, j, m) denotes a clipped image of the standard image, I' (i, j, n) denotes a clipped image of the reference image, and m and n are variables respectively indicating the numbers of the standard image and the reference image. Tv (m) is the shutter speed of the reference image, Tv (n) is the shutter speed of the reference image, and (a, b) is a variable used when finding an average of difference values.

In step 2205, the difference image generation unit 1206 determines whether or not the processing to find an average of difference values is completed for all the blocks within the set range of block matching. When the processing to find an average of difference values is completed for all the blocks, the procedure proceeds to step 2207. On the other hand, when there is a block not subjected to the processing yet, the procedure proceeds to step 2206.

In step 2206, the difference image generation unit 1206 updates the center position (ii, jj) of the block and changes the block position to a block position for which the average of difference values has not been found yet. When the block position is changed, the procedure returns to step 2204.

In step 2207, the difference image generation unit 1206 finds a center position (ii_min, jj_min) of the block the average of difference values of which is smallest and specifies the block position the average of difference values of which is smallest in the set range of block matching.

In step 2208, the difference image generation unit 1206 sets the average Eave of difference values in the pixel position that is found as a difference image E. That is, the difference image generation unit 1206 sets the average Eave (ii_min, jj_min, n) of difference values in the pixel position (ii_min, jj_min) that is found as the difference value in the target pixel (i, j) of the reference image, that is, the difference image E (i, j, n). This is expressed by a mathematical expression as Expression (13).

[Expression 13]

$$E(i,j,n) = E_{ave}(ii\_min, jj\_min, n) \qquad \text{Expression (13)}$$

In step 2209, the difference image generation unit 1206 determines whether or not the processing to find an average of difference values is completed for all the pixels within the reference image. When the processing to find an average of difference values is completed for all the pixels, the procedure proceeds to step 2211. On the other hand, when there is a pixel not subjected to the processing yet, the procedure proceeds to step 2210.

In step 2210, the difference image generation unit 1206 updates the position (i, j) of the target pixel and changes the position of the target pixel to a pixel position for which an average of difference values has not been found yet. When the position of the target pixel is changed, the procedure returns to step 2202.

In step 2211, the difference image generation unit 1206 outputs the difference image E (i, j, n) for all the pixels obtained as described above.

In the manner described above, the difference image generation processing is performed.

It is also possible to apply the method for generating a difference image according to the present embodiment to a case where no parallax occurs between captured images. In such a case, it is sufficient to set the range of block matching set in step 2203 in FIG. 22 to an extremely small range by supposing that the parallax is extremely small.

As explained above, according to the present embodiment, it is made possible to detect a blurred image while taking into account parallax between captured images that occurs when a plurality of subjects is located in different positions.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-056525, filed Mar. 15, 2011, which is hereby incorporated by reference herein in its entirety.

What is claimed is:

1. An image processing device comprising:
    an image acquisition unit configured to acquire a plurality of images captured by a camera array image capturing device having a plurality of image capturing units, which have shutter speeds that are different from one another;
    an overlap region calculation unit configured to calculate an overlap region in which field angles overlap in the plurality of image capturing units from the acquired plurality of images;
    a blurred image detection unit configured to detect an image including a blur using a region image of the plurality of images corresponding to the overlap region calculated by the overlap region calculation unit; and
    an output image selection unit configured to select, from the acquired plurality of images, an image which is not detected as an image including a blur, as an output image,
    wherein, when there is a plurality of images not detected as the image including a blur, the output image selection unit selects the image captured by the image capturing unit with the slowest shutter speed as the output image.

2. The image processing device according to claim 1, further comprising an image clipping unit configured to clip the region image from the acquired plurality of images,
    wherein the blurred image detection unit detects an image including a blur using the region image clipped by the image clipping unit.

3. The image processing device according to claim 1, wherein the blurred image detection unit receives the overlap region calculated by the overlap region calculation unit and the plurality of images acquired by the image acquisition unit, calculates the region image, and detects an image including a blur using the calculated region image.

4. The image processing device according to claim 1, wherein the blurred image detection unit detects the image including a blur by quantitatively evaluating the blur for the region image by referring to the respective shutter speeds of the plurality of image capturing units.

5. The image processing device according to claim 4, wherein in order to evaluate the blur, the blurred image detection unit includes:
    a standard image selection unit configured to select one standard image corresponding to any of the plurality of image capturing units from the region image;
    a reference image selection unit configured to select one or a plurality of reference images to be compared with the standard image from the region image, the reference image corresponding to an image capturing unit different from the image capturing unit corresponding to the standard image of the plurality of image capturing units;

a difference image generation unit configured to generate a difference image indicating a difference between the standard image and reference image that are selected by referring to the shutter speeds of the image capturing units corresponding to the respective standard image and reference image that are selected;

an evaluation value calculation unit configured to calculate an evaluation value indicating the degree of similarity between the generated difference image and the standard image; and a blurred image determination unit configured to determine the image including a blur based on the calculated evaluation value.

6. The image processing device according to claim 5, wherein the evaluation value calculation unit calculates an evaluation value focused on the frequency characteristics of the difference image.

7. The image processing device according to claim 5, wherein the difference image generation unit finds difference values of adjacent pixels of an arbitrary target pixel position in the selected standard image and the reference image, sets the position of the pixel the difference value of which is the smallest of the difference values that are found as a pixel position of a difference image, and thus generates the difference image.

8. The image processing device according to claim 1, wherein the overlap region calculation unit calculates the overlap region based on parameters relating to the plurality of image capturing units.

9. The image processing device according to claim 8, wherein the parameters include at least one of the focal length, the sensor size, the number of pixels of the sensor, the focus position, and the relative position of the image capturing unit for each of the plurality of image capturing units.

10. An image processing method, the method comprising the steps of:
acquiring a plurality of images captured by a camera array image capturing device having a plurality of image capturing units, which have shutter speeds that are different from one another;

calculating an overlap region in which field angles overlap in the plurality of image capturing units from the acquired plurality of images;

detecting an image including a blur using a region image of the plurality of images corresponding to the calculated overlap region; and selecting, from the acquired plurality of images, an image which is not detected as an image including a blur, as an output image, wherein, when there is a plurality of images not detected as the image including a blur, the selecting step selects the image captured by the image capturing unit with the slowest shutter speed as the output image.

11. A program stored in a non-transitory computer readable storage medium for causing a computer to perform the control method according to claim 10.

12. An image processing device comprising:
an image acquisition unit configured to acquire a plurality of images obtained by capturing a same subject with exposure times that are different from each other, wherein exposure periods of the plurality of images overlap with each other;

a judging unit configured to judge whether each of the plurality of images includes a blur or not;

an output image selection unit configured to select, from the acquired plurality of images, an image which is not judged as an image including a blur, as an output image, wherein, when there is a plurality of images not selected as the image including a blur, the output image selection unit selects the image captured by the image capturing unit with the slowest shutter speed as an output image.

13. The image processing device according to claim 12, further comprising an overlap region calculation unit configured to calculate an overlap region in which field angles overlap in the acquired plurality of images from the acquired plurality of images.

14. The image processing device according to claim 12, wherein the plurality of images are images captured by a camera array image capturing device having a plurality of image capturing units, which have shutter speeds that are different from one another.

* * * * *